US010936887B2

(12) United States Patent
Meng et al.

(10) Patent No.: US 10,936,887 B2
(45) Date of Patent: Mar. 2, 2021

(54) VEHICLE CONTROL METHOD AND SYSTEM, VEHICLE-MOUNTED INTELLIGENT SYSTEM, ELECTRONIC DEVICE, AND MEDIUM

(71) Applicant: SHANGHAI SENSETIME INTELLIGENT TECHNOLOGY CO., LTD., Shanghai (CN)

(72) Inventors: De Meng, Shanghai (CN); Ke Li, Shanghai (CN); Chendi Yu, Shanghai (CN); Renbo Qin, Shanghai (CN)

(73) Assignee: SHANGHAI SENSETIME INTELLIGENT TECHNOLOGY CO., LTD., Shanghai (CN)

( * ) Notice: Subject to any disclaimer, the term of this patent is extended or adjusted under 35 U.S.C. 154(b) by 148 days.

(21) Appl. No.: 16/233,064

(22) Filed: Dec. 26, 2018

(65) Prior Publication Data
US 2019/0370578 A1 Dec. 5, 2019

Related U.S. Application Data

(63) Continuation of application No. PCT/CN2018/105809, filed on Sep. 14, 2018.

(30) Foreign Application Priority Data

Jun. 4, 2018 (CN) .......................... 201810565700.3

(51) Int. Cl.
*G06K 9/00* (2006.01)
*G06K 9/62* (2006.01)
(Continued)

(52) U.S. Cl.
CPC .......... *G06K 9/00845* (2013.01); *B60R 25/25* (2013.01); *B60W 40/09* (2013.01);
(Continued)

(58) Field of Classification Search
CPC .......... G06K 9/00221; G06K 9/00281; G06K 9/00288; G06K 9/00302; G06K 9/00845;
(Continued)

(56) References Cited

U.S. PATENT DOCUMENTS 7,362,210 B2  4/2008  Bazakos et al. ............. 340/5.53
8,300,891 B2  10/2012  Chen et al. .................. 382/103
(Continued)

FOREIGN PATENT DOCUMENTS

CN  101902619 A  12/2010  ............... H04N 7/18
CN  102975690 A   3/2013  ............. B60R 25/25
(Continued)

OTHER PUBLICATIONS

International Search Report in the international application No. PCT/CN2018/105809, dated Mar. 6, 2019.
(Continued)

*Primary Examiner* — Andrew W Johns
(74) *Attorney, Agent, or Firm* — Syncoda LLC; Feng Ma

(57) ABSTRACT

A vehicle control method and system includes: acquiring a face image of a user currently requesting to use a vehicle; acquiring a feature matching result between the face image and at least one pre-stored face image in a data set of the vehicle, where the data set stores pre-stored face images of at least one pre-recorded user allowed to use the vehicle; and if the feature matching result indicates that the feature matching is successful, controlling actions of the vehicle to allow the user to use the vehicle. The rights of pre-recorded personnel can be guaranteed based on feature matching, and feature matching can be achieved without a network, thereby overcoming the dependency on the network and further improving the safety guarantee of the vehicle.

26 Claims, 10 Drawing Sheets

(51) Int. Cl.
   *G06T 7/73*       (2017.01)
   *B60R 25/25*      (2013.01)
   *B60W 40/09*      (2012.01)
   *B60W 50/12*      (2012.01)
   *B60W 50/14*      (2020.01)
   *G05D 1/00*       (2006.01)
   *B60W 40/08*      (2012.01)
   *B60W 50/00*      (2006.01)

(52) U.S. Cl.
   CPC ............ *B60W 50/12* (2013.01); *B60W 50/14* (2013.01); *G06K 9/00255* (2013.01); *G06K 9/00288* (2013.01); *G06K 9/00906* (2013.01); *G06K 9/6202* (2013.01); *G06T 7/73* (2017.01); *B60W 2040/0827* (2013.01); *B60W 2050/0071* (2013.01); *B60W 2050/143* (2013.01); *B60W 2540/26* (2013.01); *B60W 2900/00* (2013.01); *G05D 1/0061* (2013.01); *G06T 2207/30201* (2013.01); *G06T 2207/30252* (2013.01); *G06T 2207/30268* (2013.01)

(58) Field of Classification Search
   CPC ........... G06T 2207/30201; G06T 2207/30268; B60K 28/02; B60K 28/04; B60K 28/06; B60K 28/063; B60K 28/066
   See application file for complete search history.

(56) References Cited

U.S. PATENT DOCUMENTS

| | | | |
|---|---|---|---|
| 9,317,759 B2 | 4/2016 | Inada et al. | G06K 9/00845 |
| 9,751,534 B2 | 9/2017 | Fung et al. | B60W 40/08 |
| 9,963,106 B1 | 5/2018 | Ricci | B60R 25/2018 |
| 2005/0110610 A1 | 5/2005 | Bazakos et al. | 340/5.82 |
| 2006/0072792 A1 | 4/2006 | Toda et al. | 382/115 |
| 2008/0252412 A1 | 10/2008 | Larsson et al. | 340/5.2 |
| 2008/0297330 A1 | 12/2008 | Jeon | 340/426.11 |
| 2009/0046538 A1 | 2/2009 | Breed et al. | 367/93 |
| 2011/0091079 A1 | 4/2011 | Yu-Song et al. | 382/118 |
| 2014/0139655 A1* | 5/2014 | Mimar | G08B 21/0476 348/77 |
| 2014/0369553 A1* | 12/2014 | Tsou et al. | G06K 9/00281 382/103 |
| 2015/0010207 A1 | 1/2015 | Inada et al. | G06K 9/00845 |
| 2016/0001781 A1 | 1/2016 | Fung et al. | B60W 40/08 |
| 2016/0300410 A1* | 10/2016 | Jones et al. | G06K 9/00348 |
| 2016/0311400 A1 | 10/2016 | Gennermann | B60R 25/2018 |
| 2017/0341658 A1 | 11/2017 | Fung et al. | B60W 40/08 |
| 2018/0022358 A1 | 1/2018 | Fung et al. | B60W 40/08 |
| 2018/0025240 A1* | 1/2018 | Klement et al. | H04N 13/239 348/47 |
| 2018/0126901 A1 | 5/2018 | Levkova et al. | B60Q 9/00 |
| 2018/0127001 A1 | 5/2018 | Ricci | B60W 40/09 |
| 2018/0129204 A1 | 5/2018 | Ricci et al. | G05D 1/0088 |
| 2018/0130347 A1 | 5/2018 | Ricci et al. | G08G 1/0125 |
| 2018/0215392 A1 | 8/2018 | Kosaka et al. | B60W 50/12 |
| 2018/0312168 A1* | 11/2018 | Li | B60W 40/08 |
| 2019/0108407 A1* | 4/2019 | Okayasu | A61B 5/0013 |
| 2019/0122525 A1 | 4/2019 | Lancelle | G08B 21/06 |
| 2019/0152390 A1 | 5/2019 | Levkova et al. | B60Q 9/00 |
| 2019/0241190 A1 | 8/2019 | Fung et al. | B60W 40/08 |
| 2019/0276032 A1 | 9/2019 | Fung et al. | B60W 40/08 |
| 2019/0276033 A1 | 9/2019 | Fung et al. | B60W 40/08 |
| 2019/0276034 A1 | 9/2019 | Fung et al. | B60W 40/08 |
| 2019/0300002 A1 | 10/2019 | Fung et al. | B60W 40/08 |
| 2020/0218883 A1* | 7/2020 | Wang et al. | G06K 9/00214 |

FOREIGN PATENT DOCUMENTS

| | | | |
|---|---|---|---|
| CN | 103303257 A | 9/2013 | B60R 25/25 |
| CN | 104143090 A | 11/2014 | G06K 9/00 |
| CN | 104169993 A | 11/2014 | G08G 1/16 |
| CN | 104408878 A | 3/2015 | G08B 21/06 |
| CN | 104732251 A | 6/2015 | G06K 9/66 |
| CN | 105035025 A | 11/2015 | B60R 25/25 |
| CN | 105469035 A | 4/2016 | G06K 9/00 |
| CN | 105654753 A | 6/2016 | G08G 1/0967 |
| CN | 105843375 A | 8/2016 | G06F 3/01 |
| CN | 106218405 A | 12/2016 | B60K 28/06 |
| CN | 106335469 A | 1/2017 | B60R 25/25 |
| CN | 107316363 A | 11/2017 | G07C 9/00 |
| CN | 107578025 A | 1/2018 | G06K 9/00 |
| CN | 107657236 A | 2/2018 | G06K 9/00 |
| CN | 107832748 A | 3/2018 | G06K 9/00 |
| CN | 107891746 A | 4/2018 | B60K 28/06 |
| CN | 108022451 A | 5/2018 | G08G 1/16 |
| CN | 207433445 U | 6/2018 | B60R 16/037 |
| DE | 202008005694 U1 | 7/2008 | B60R 25/00 |
| FR | 3048544 A1 | 9/2017 | G08B 21/06 |
| JP | 2006168553 A | 6/2006 | |
| JP | 2010143325 A | 7/2010 | |
| JP | 2011032782 A | 2/2011 | E05B 49/00 |
| JP | 2012164040 A | 8/2012 | |
| JP | 2015133050 A | 7/2015 | |
| JP | 2017531112 A | 10/2017 | |
| JP | 2017206183 A | 11/2017 | |
| JP | 2018013811 A | 1/2018 | |
| WO | 2007008159 A2 | 1/2007 | B60R 25/00 |
| WO | 2008147036 A1 | 12/2008 | G06K 9/68 |
| WO | 2015091679 A1 | 6/2015 | B60R 25/20 |
| WO | 2017163488 A1 | 9/2017 | |
| WO | 2017193272 A1 | 11/2017 | G08B 21/06 |

OTHER PUBLICATIONS

First Office Action of the Chinese application No. 201810565700.3, dated Jul. 1, 2019.
Supplementary European Search Report in the European application No. 18919403.8, dated Jul. 7, 2020.
International Search Report in the international application No. PCT/CN2018/105790, dated Mar. 8, 2019.
Supplementary European Search Report in the European application No. 18919400.4, dated Jun. 5, 2020.
First Office Action of the Chinese application No. 201810565711.1, dated Apr. 30, 2020.
First Office Action of the U.S. Appl. No. 16/224,389, dated Jul. 1, 2020.
First Office Action of the Japanese application No. 2019-564878, dated Jan. 12, 2021.

* cited by examiner

VEHICLE CONTROL METHOD AND SYSTEM, VEHICLE-MOUNTED INTELLIGENT SYSTEM, ELECTRONIC DEVICE, AND MEDIUM

CROSS-REFERENCE TO RELATED APPLICATIONS

This is a continuation application of International Patent Application No. PCT/CN2018/105809, filed on Sep. 14, 2018, which claims priority to Chinese Patent Application No. CN201810565700.3, filed to the Chinese Patent Office on Jun. 4, 2018, and entitled "VEHICLE CONTROL METHOD AND SYSTEM, VEHICLE-MOUNTED INTELLIGENT SYSTEM, ELECTRONIC DEVICE, AND MEDIUM", which is incorporated herein by reference in its entirety.

TECHNICAL FIELD

The disclosure relates to intelligent recognition technologies for vehicles, and in particular, to a vehicle control method and system, a vehicle-mounted intelligent system, an electronic device, and a medium.

BACKGROUND

An intelligent vehicle is a comprehensive system integrating environment perception, planning decision-making, multi-level assisted driving and other functions, and uses computer, modern sensing, information fusion, communication, artificial intelligence, automatic control and other technologies, and thus is a typical high-tech complex. At present, the research on intelligent vehicles is mainly aimed at improving the safety and comfort of automobiles and providing an excellent human-vehicle interactive interface. In recent years, intelligent vehicles have become the hotspot of research in the field of vehicle engineering in the world and the new driving force for the growth of the automobile industry. Many developed countries have incorporated the intelligent vehicles into their own intelligent transportation systems.

SUMMARY

Embodiments of the disclosure provide vehicle control method and system, vehicle-mounted intelligent system, electronic device, and medium.

A vehicle control method provided according to one aspect of the embodiments of the disclosure includes:

acquiring a face image of a user currently requesting to use a vehicle;

acquiring a feature matching result between the face image and at least one pre-stored face image in a data set of the vehicle, where the data set stores pre-stored face images of at least one pre-recorded user allowed to use the vehicle; and if the feature matching result indicates that the feature matching is successful, controlling vehicle actions to allow the user to use the vehicle.

According to one or more embodiments of the present disclosure, the using a vehicle includes one or any combination of: reserving use of a vehicle, driving a vehicle, riding a vehicle, cleaning a vehicle, maintaining a vehicle, repairing a vehicle, refueling a vehicle, and charging a vehicle.

According to one or more embodiments of the present disclosure, the data set stores the pre-stored face image of at least one user having reserved a ride; and the controlling vehicle actions to allow the user to use the vehicle includes: controlling opening of vehicle doors.

According to one or more embodiments of the present disclosure, the data set stores the pre-stored face image of at least one user having reserved use of a vehicle; and the controlling vehicle actions to allow the user to use the vehicle includes: controlling opening of vehicle doors and release of driving control rights of the vehicle.

According to one or more embodiments of the present disclosure, the data set stores the pre-stored face image of at least one user having been recorded and allowed to ride the vehicle; and the controlling vehicle actions to allow the user to use the vehicle includes: controlling opening of vehicle doors.

According to one or more embodiments of the present disclosure, the data set stores the pre-stored face image of at least one user having been recorded and allowed to use the vehicle; and the controlling vehicle actions to allow the user to use the vehicle includes: controlling opening of vehicle doors and release of driving control rights of the vehicle.

According to one or more embodiments of the present disclosure, the data set stores the pre-stored face image of at least one user having reserved unlocking or having been recorded and allowed to open a lock; and the controlling vehicle actions to allow the user to use the vehicle includes: controlling opening of a vehicle lock.

According to one or more embodiments of the present disclosure, the data set stores the pre-stored face image of at least one user having reserved refueling of a vehicle or having been recorded and allowed to refuel a vehicle; and the controlling vehicle actions to allow the user to use the vehicle includes: controlling opening of a fuel filler of the vehicle.

According to one or more embodiments of the present disclosure, the data set stores the pre-stored face image of at least one user having reserved charging of a vehicle or having been recorded and allowed to charge a vehicle; and the controlling vehicle actions to allow the user to use the vehicle includes: performing control to allow a charging device to connect to a battery of the vehicle.

According to one or more embodiments of the present disclosure, the method further includes: controlling the vehicle to issue prompt information for indicating that the user is allowed to use the vehicle.

According to one or more embodiments of the present disclosure, the acquiring a face image of a user currently requesting to use a vehicle includes:

collecting a face image of the user by means of a photographing component provided on the vehicle.

According to one or more embodiments of the present disclosure, the method further includes:

sending, when the vehicle is in a communication connection with a cloud server, a data set download request to the cloud server; and receiving and storing the data set sent by the cloud server.

According to one or more embodiments of the present disclosure, the method further includes:

if the feature matching result indicates that the feature matching is successful, acquiring identity information of the user according to the pre-stored face image with successful feature matching; and sending the face image and the identity information to the cloud server.

According to one or more embodiments of the present disclosure, the method further includes: acquiring a living body detection result of the face image;

the controlling, according to the feature matching result, vehicle actions to allow the user to use the vehicle includes:

controlling, according to the feature matching result and the living body detection result, vehicle actions to allow the user to use the vehicle.

According to one or more embodiments of the present disclosure, the method further includes:

sending, when the vehicle is in a communication connection with a mobile device, a data set download request to the mobile device; and receiving and storing the data set sent by the mobile device.

According to one or more embodiments of the present disclosure, the data set is acquired from the cloud server and sent to the vehicle by the mobile device upon reception of the data set download request.

According to one or more embodiments of the present disclosure, the method further includes:

if the feature matching result indicates that the feature matching is unsuccessful, controlling vehicle actions to refuse the user to use the vehicle.

According to one or more embodiments of the present disclosure, the method further includes:

issuing prompt reservation information;

receiving a reservation request of the user according to the reservation information, the reservation request of the user including a reserved face image of the user; and establishing a data set according to the reserved face image.

According to one or more embodiments of the present disclosure, the method further includes:

performing user state detection based on the face image; and outputting a forewarning prompt for an abnormal state according to the result of the user state detection.

According to one or more embodiments of the present disclosure, the user state detection includes any one or more of: user fatigue state detection, user distraction state detection, and user's predetermined distraction action detection.

According to one or more embodiments of the present disclosure, the performing user fatigue state detection based on the face image includes:

detecting at least part of a face region of the face image to obtain state information of the at least part of the face region, the state information of the at least part of the face region including any one or more of: eye open/closed state information and mouth open/closed state information;

acquiring a parameter value of an index for representing a user fatigue state according to the state information of the at least part of the face region within a period of time; and determining the result of the user fatigue state detection according to the parameter value of the index for representing the user fatigue state.

According to one or more embodiments of the present disclosure, the index for representing the user fatigue state includes any one or more of: an eye closure degree and a yawning degree.

According to one or more embodiments of the present disclosure, the parameter value of the eye closure degree includes any one or more of: the number of eye closures, eye closure frequency, eye closure duration, eye closure amplitude, the number of eye semi-closures, and eye semi-closure frequency; and/or the parameter value of the yawning degree includes any one or more of: a yawning state, the number of yawns, yawning duration, and yawning frequency.

According to one or more embodiments of the present disclosure, the performing user distraction state detection based on the face image includes:

performing face orientation and/or gaze direction detection on the face image to obtain face orientation information and/or gaze direction information;

determining a parameter value of an index for representing a user distraction state according to the face orientation information and/or the gaze direction information within a period of time, the index for representing the user distraction state including any one or more of: a face orientation deviation degree and a gaze deviation degree; and determining the result of the user distraction state detection according to the parameter value of the index for representing the user distraction state.

According to one or more embodiments of the present disclosure, the parameter value of the face orientation deviation degree includes any one or more of: the number of head turns, head turning duration, and head turning frequency; and/or the parameter value of the gaze deviation degree includes any one or more of: a gaze direction deviation angle, gaze direction deviation duration, and gaze direction deviation frequency.

According to one or more embodiments of the present disclosure, the performing face orientation and/or gaze direction detection on the user in the face image includes:

detecting face key points of the face image; and performing face orientation and/or gaze direction detection according to the face key points.

According to one or more embodiments of the present disclosure, the performing face orientation detection according to the face key points to obtain the face orientation information includes:

acquiring feature information of head pose according to the face key points; and determining the face orientation information according to the feature information of the head pose.

According to one or more embodiments of the present disclosure, the predetermined distraction action includes any one or more of: a smoking action, a drinking action, an eating action, a calling action, and an entertainment action.

According to one or more embodiments of the present disclosure, the performing user's predetermined distraction action detection based on the face image includes:

performing target object detection corresponding to the predetermined distraction action on the face image to obtain a detection frame for a target object; and determining whether the predetermined distraction action occurs according to the detection frame for the target object.

According to one or more embodiments of the present disclosure, the method further includes:

if the predetermined distraction action occurs, acquiring a parameter value of an index for representing a user distraction degree according to the determination result indicating whether the predetermined distraction action occurs within a period of time; and determining the result of the user's predetermined distraction action detection according to the parameter value of the index for representing the user distraction degree.

According to one or more embodiments of the present disclosure, the parameter value of the index for representing the user distraction degree includes any one or more of: the number of occurrences of the predetermined distraction action, duration of the predetermined distraction action, and frequency of the predetermined distraction action.

According to one or more embodiments of the present disclosure, the method further includes:

if the result of the user's predetermined distraction action detection is that a predetermined distraction action is detected, prompting the detected predetermined distraction action.

According to one or more embodiments of the present disclosure, the method further includes:

executing a control operation corresponding to the result of the user state detection.

According to one or more embodiments of the present disclosure, the executing a control operation corresponding to the result of the user state detection includes at least one of:

if the determined result of the user state detection satisfies a predetermined prompt/warning condition, outputting prompt/warning information corresponding to the predetermined prompt/warning condition; and/or if the determined result of the user state detection satisfies a predetermined information sending condition, sending predetermined information to a preset contact or establishing a communication connection with the preset contact; and/or if the determined result of the user state detection satisfies a predetermined driving mode switching condition, switching the driving mode to an automatic driving mode.

According to one or more embodiments of the present disclosure, the method further includes:

sending at least part of the result of the user state detection to the cloud server.

According to one or more embodiments of the present disclosure, the at least part of the result includes: abnormal vehicle use state information determined according to the user state detection.

According to one or more embodiments of the present disclosure, the method further includes:

storing face images corresponding to the abnormal vehicle use state information; and/or sending the face images corresponding to the abnormal vehicle use state information to the cloud server.

A vehicle-mounted intelligent system provided according to another aspect of the embodiments of the disclosure includes:

a user image acquisition unit, configured to acquire a face image of a user currently requesting to use a vehicle;

a matching unit, configured to acquire a feature matching result between the face image and at least one pre-stored face image in a data set of the vehicle, where the data set stores pre-stored face images of at least one pre-recorded user allowed to use the vehicle; and a vehicle control unit, configured to control, if the feature matching result indicates that the feature matching is successful, vehicle actions to allow the user to use the vehicle.

A vehicle control method provided according to still another aspect of the embodiments of the disclosure includes:

receiving a to-be-recognized face image sent by a vehicle;

acquiring a feature matching result between the face image and at least one pre-stored face image in a data set, where the data set stores pre-stored face images of at least one pre-recorded user allowed to use the vehicle; and if the feature matching result indicates that the feature matching is successful, sending to the vehicle an instruction of allowing controlling the vehicle.

According to one or more embodiments of the present disclosure, the method further includes:

receiving a data set download request sent by the vehicle, the data set storing pre-stored face images of at least one pre-recorded user allowed to use the vehicle; and sending the data set to the vehicle.

According to one or more embodiments of the present disclosure, the method further includes:

receiving a reservation request sent by the vehicle or a mobile device, the reservation request including a reserved face image of the user; and establishing a data set according to the reserved face image.

According to one or more embodiments of the present disclosure the acquiring a feature matching result between the face image and at least one pre-stored face image in a data set includes:

acquiring, from the vehicle, the feature matching result between the face image and the at least one pre-stored face image in the data set.

According to one or more embodiments of the present disclosure, the method further includes:

receiving at least part of the result of the user state detection sent by the vehicle, and outputting a forewarning prompt for an abnormal vehicle use state.

According to one or more embodiments of the present disclosure, the at least part of the result includes: abnormal vehicle use state information determined according to the user state detection.

According to one or more embodiments of the present disclosure, the method further includes: executing a control operation corresponding to the result of the user state detection.

According to one or more embodiments of the present disclosure, the executing a control operation corresponding to the result of the user state detection includes:

if the determined result of the user state detection satisfies a predetermined prompt/warning condition, outputting prompt/warning information corresponding to the predetermined prompt/warning condition; and/or if the determined result of the user state detection satisfies a predetermined information sending condition, sending predetermined information to a predetermined contact or establishing a communication connection with the predetermined contact; and/or if the determined result of the user state detection satisfies a predetermined driving mode switching condition, switching the driving mode to an automatic driving mode.

According to one or more embodiments of the present disclosure, the method further includes: receiving face images corresponding to the abnormal vehicle use state information and sent by the vehicle.

According to one or more embodiments of the present disclosure, the method further includes: performing at least one of the following operations based on the abnormal vehicle use state information:

data statistics, vehicle management, and user management.

According to one or more embodiments of the present disclosure, the performing data statistics based on the abnormal vehicle use state information includes:

collecting, based on the abnormal vehicle use state information, statistics on the received face images corresponding to the abnormal vehicle use state information to classify the face images according to different abnormal vehicle use states, so as to determine statistics of each of the abnormal vehicle use states.

According to one or more embodiments of the present disclosure, the performing vehicle management based on the abnormal vehicle use state information includes:

collecting, based on the abnormal vehicle use state information, statistics on the received face images corresponding to the abnormal vehicle use state information to classify the face images according to different vehicles, so as to determine abnormal vehicle use statistics of each of the vehicles.

According to one or more embodiments of the present disclosure, the performing user management based on the abnormal vehicle use state information includes:

processing, based on the abnormal vehicle use state information, the received face images corresponding to the abnormal vehicle use state information to classify the face images according to different users, so as to determine abnormal vehicle use statistics of each of the users.

An electronic device provided according to yet another aspect of the embodiments of the disclosure includes:

an image receiving unit, configured to receive a to-be-recognized face image sent by a vehicle;

a matching result obtaining unit, configured to obtain a feature matching result between the face image and at least one pre-stored face image in a data set, where the data set stores pre-stored face images of at least one pre-recorded user allowed to use the vehicle; and an instruction sending unit, configured to send, if the feature matching result indicates that the feature matching is successful, to the vehicle an instruction of allowing controlling the vehicle.

A vehicle control system provided according to still yet another aspect of the embodiments of the disclosure includes: a vehicle and/or a cloud server;

the vehicle is configured to execute the vehicle management method according to any one of the foregoing embodiments; and the cloud server is configured to execute the vehicle control method according to any one of the foregoing embodiments.

According to one or more embodiments of the present disclosure, the vehicle control system further includes: a mobile device, configured to:

receive a user registration request including a registered face image of a user; and send the user registration request to the cloud server.

An electronic device according to still yet another aspect of the embodiments of the disclosure includes: a memory, configured to store executable instructions; and a processor, configured to communicate with the memory to execute the executable instructions so as to complete the vehicle control method according to any one of the foregoing embodiments.

A computer program provided according to still yet another aspect of the embodiments of the disclosure includes: a computer readable code, where when the computer readable code runs in an electronic device, a processor in the electronic device executes to implement the vehicle control method according to any one of the foregoing embodiments.

A computer storage medium provided according to another aspect of the embodiments of the disclosure is configured to store computer readable instructions, where the instructions are executed to implement the vehicle control method according to any one of the foregoing embodiments.

A vehicle control method, performed by a vehicle device, comprising:

acquiring, by a photographing component provided on a vehicle, a face image of a user currently requesting to use the vehicle;

acquiring a result of a feature matching between the face image and at least one pre-stored face image in a data set of the vehicle, wherein the data set stores one or more pre-stored face images of at least one pre-recorded user allowed to use the vehicle; and if the result of the feature matching indicates that the feature matching is successful, controlling actions of the vehicle to allow the user to use the vehicle, otherwise, controlling the actions of the vehicle to refuse the user to use the vehicle.

According to one or more embodiments of the present disclosure, the operation of using the vehicle comprises at least one of reserving use of a vehicle, driving a vehicle, riding a vehicle, cleaning a vehicle, maintaining a vehicle, repairing a vehicle, refueling a vehicle, or charging a vehicle;

wherein the data set stores the pre-stored face image of at least one user having reserved a ride;

the operation of controlling actions of the vehicle to allow the user to use the vehicle comprises at least one of: controlling opening of vehicle doors, controlling opening of vehicle doors, controlling opening of vehicle doors and release of driving control rights of the vehicle, controlling opening of vehicle doors, controlling opening of vehicle doors and release of driving control rights of the vehicle, controlling opening of a vehicle lock, controlling opening of a fuel filler of the vehicle or performing control to allow a charging device to connect to a battery of the vehicle.

According to one or more embodiments of the present disclosure, the method further includes: controlling the vehicle to issue prompt information for indicating that the user is allowed to use the vehicle.

According to one or more embodiments of the present disclosure, the operation of acquiring a face image of a user currently requesting to use a vehicle comprises:

collecting a face image of the user by means of a photographing component provided on the vehicle.

According to one or more embodiments of the present disclosure, the method further includes: sending, when the vehicle is in a communication connection state with a cloud server, a data set download request to the cloud server; and receiving and storing the data set sent by the cloud server; or sending, when the vehicle is in a communication connection state with a mobile device, the data set download request to the mobile device; and receiving and storing the data set sent by the mobile device, wherein the data set is acquired from the cloud server and sent to the vehicle by the mobile device upon reception of the data set download request.

According to one or more embodiments of the present disclosure, the method further includes:

if the result of the feature matching indicates that the feature matching is successful, acquiring identity information of the user according to a pre-stored face image of which the feature matching is successful; and sending the face image and the identity information to the cloud server.

According to one or more embodiments of the present disclosure, the method further includes:

acquiring a living body detection result of the face image;

the operation of controlling, according to the result of the feature matching, actions of the vehicle to allow the user to use the vehicle comprises:

controlling, according to the result of the feature matching and the living body detection result, the actions of the vehicle to allow the user to use the vehicle.

According to one or more embodiments of the present disclosure, the method further includes:

issuing prompt reservation information;

receiving a reservation request of the user according to the prompt reservation information, the reservation request of the user comprising a reserved face image of the user; and establishing a data set according to the reserved face image.

According to one or more embodiments of the present disclosure, the method further includes:

performing user state detection based on the face image;

outputting a forewarning prompt for an abnormal state according to a result of the user state detection, wherein the user state detection comprises at least one of: user fatigue state detection, user distraction state detection, or user's predetermined distraction action detection; wherein the operation of performing user fatigue state detection based on the face image comprises:

detecting at least part of a face region of the face image to obtain state information of the at least part of the face region, the state information of the at least part of the face region comprising at least one of: eye open/closed state information or mouth open/closed state information;

acquiring a parameter value of an index for representing a user fatigue state according to the state information of the at least part of the face region within a period of time;

determining a result of the user fatigue state detection according to the parameter value of the index for representing the user fatigue state, wherein the index for representing the user fatigue state comprises at least one of an eye closure degree or a yawning degree;

wherein the parameter value of the eye closure degree comprises at least one of the number of eye closures, eye closure frequency, eye closure duration, eye closure amplitude, the number of eye semi-closures, or eye semi-closure frequency; and the parameter value of the yawning degree comprises at least one of a yawning state, the number of yawns, yawning duration, or yawning frequency.

According to one or more embodiments of the present disclosure, the operation of performing user distraction state detection based on the face image comprises:

performing at least one of the following operations: performing face orientation detection on the face image to obtain face orientation information; or performing gaze direction detection on the face image to obtain gaze direction information;

determining a parameter value of an index for representing a user distraction state according to at least one of the face orientation information or the gaze direction information within a period of time, the index for representing the user distraction state comprising at least one of a face orientation deviation degree or a gaze deviation degree, wherein the parameter value of the face orientation deviation degree comprises at least one of the number of head turns, head turning duration, or head turning frequency; and the parameter value of the gaze deviation degree comprises at least one of a gaze direction deviation angle, gaze direction deviation duration, or gaze direction deviation frequency; and determining a result of the user distraction state detection according to the parameter value of the index for representing the user distraction state.

According to one or more embodiments of the present disclosure, wherein the operation of performing face orientation on the user in the face image comprises: detecting face key points of the face image; and performing face orientation according to the face key points; and wherein the operation of performing gaze direction detection on the user in the face image comprises: detecting face key points of the face image; and performing gaze direction detection according to the face key points.

According to one or more embodiments of the present disclosure, wherein the operation of performing face orientation detection according to the face key points to obtain the face orientation information comprises:

acquiring feature information of head pose according to the face key points; and determining the face orientation information according to the feature information of the head pose.

According to one or more embodiments of the present disclosure, wherein the predetermined distraction action comprises at least one of a smoking action, a drinking action, an eating action, a calling action, or an entertainment action, wherein the operation of performing user's predetermined distraction action detection based on the face image comprises:

performing target object detection corresponding to the predetermined distraction action on the face image to obtain a detection frame for a target object;

determining whether the predetermined distraction action occurs according to the detection frame for the target object.

According to one or more embodiments of the present disclosure, the method further includes:

if the predetermined distraction action occurs, acquiring a parameter value of an index for representing a user distraction degree according to the determination result indicating whether the predetermined distraction action occurs within a period of time, wherein the parameter value of the index for representing the user distraction degree comprises at least one of the number of occurrences of the predetermined distraction action, duration of the predetermined distraction action, or frequency of the predetermined distraction action; and determining the result of the user's predetermined distraction action detection according to the parameter value of the index for representing the user distraction degree.

According to one or more embodiments of the present disclosure, the method further includes:

if the result of the user's predetermined distraction action detection is that a predetermined distraction action is detected, prompting the detected predetermined distraction action.

According to one or more embodiments of the present disclosure, the method further includes:

executing a control operation corresponding to the result of the user state detection, comprising at least one of:

if the determined result of the user state detection satisfies a predetermined prompt/warning condition, outputting prompt/warning information corresponding to the predetermined prompt/warning condition;

if the determined result of the user state detection satisfies a predetermined information sending condition, sending predetermined information to a preset contact or establishing a communication connection with the preset contact; or if the determined result of the user state detection satisfies a predetermined driving mode switching condition, switching a driving mode to an automatic driving mode.

According to one or more embodiments of the present disclosure, the method further includes:

sending at least part of the result of the user state detection to the cloud server, wherein the at least part of the result comprises: abnormal vehicle use state information determined according to the user state detection; and the method further includes at least one of:

storing face images corresponding to the abnormal vehicle use state information; or sending the face image corresponding to the abnormal vehicle use state information to the cloud server.

A vehicle-mounted intelligent system provided according to another aspect of the embodiments of the disclosure includes:

a processor; and a memory for storing instructions executable by the processor;

when the instructions are executed by the processor, causing the executions of a method comprising:

acquiring a face image of a user currently requesting to use a vehicle;

acquiring a result of a feature matching between the face image and at least one pre-stored face image in a data set of the vehicle, wherein the data set stores one or more pre-stored face images of at least one pre-recorded user allowed to use the vehicle; and if the result of the feature matching indicates that the feature matching is successful, controlling actions of the vehicle to allow the user to use the vehicle, otherwise, controlling the actions of the vehicle to refuse the user to use the vehicle.

A vehicle control method provided according to still yet another aspect of the embodiments of the disclosure, performed by a cloud server, including:

receiving a to-be-recognized face image sent by a vehicle;

acquiring a result of a feature matching between the to-be-recognized face image and at least one pre-stored face image in a data set, wherein the data set stores one or more pre-stored face images of at least one pre-recorded user allowed to use the vehicle; and if the result of the feature matching indicates that the feature matching is successful, sending to the vehicle an instruction indicating allowing controlling actions of the vehicle, otherwise, sending to the vehicle an instruction indicating refusing controlling actions of the vehicle.

According to one or more embodiments of the present disclosure, the method further includes:

receiving a data set download request sent by the vehicle;

sending the data set to the vehicle;

receiving a reservation request sent by the vehicle or a mobile device, the reservation request comprising a reserved face image of the user; and establishing a data set according to the reserved face image.

According to one or more embodiments of the present disclosure, wherein the operation of acquiring a feature matching result between the face image and at least one pre-stored face image in a data set comprises:

acquiring, from the vehicle, the feature matching result between the face image and the at least one pre-stored face image in the data set.

According to one or more embodiments of the present disclosure, the method further includes:

receiving at least part of the result of the user state detection sent by the vehicle, and performing a forewarning prompt for an abnormal vehicle use state, wherein the at least part of the result comprises: abnormal vehicle use state information determined according to the user state detection;

executing a control operation corresponding to the result of the user state detection, comprising at least one of:

if the determined result of the user state detection satisfies a predetermined prompt/warning condition, outputting prompt/warning information corresponding to the predetermined prompt/warning condition;

if the determined result of the user state detection satisfies a predetermined information sending condition, sending predetermined information to a predetermined contact or establishing a communication connection with the predetermined contact; or if the determined result of the user state detection satisfies a predetermined driving mode switching condition, switching the driving mode to an automatic driving mode.

According to one or more embodiments of the present disclosure, the method further includes:

receiving face images corresponding to the abnormal vehicle use state information and sent by the vehicle.

According to one or more embodiments of the present disclosure, the method further includes:

performing at least one of the following operations based on the abnormal vehicle use state information: data statistics, vehicle management, or user management wherein the operation of performing data statistics based on the abnormal vehicle use state information comprises:

collecting, based on the abnormal vehicle use state information, statistics on the received face images corresponding to the abnormal vehicle use state information to classify the face images according to different abnormal vehicle use states, so as to determine statistics of each of the abnormal vehicle use states;

wherein the operation of performing vehicle management based on the abnormal vehicle use state information comprises:

collecting, based on the abnormal vehicle use state information, statistics on the received face images corresponding to the abnormal vehicle use state information to classify the face images according to different vehicles, so as to determine abnormal vehicle use statistics of each of the vehicles;

wherein the operation of performing user management based on the abnormal vehicle use state information comprises:

processing, based on the abnormal vehicle use state information, the received face images corresponding to the abnormal vehicle use state information to classify the face images according to different users, so as to determine abnormal vehicle use statistics of each of the users.

An electronic device provided according to yet another aspect of the embodiments of the disclosure includes: a processor; and a memory for storing instructions executable by the processor; when the instructions are executed by the processor, causing the executions of a method comprising:

receiving a to-be-recognized face image sent by a vehicle;

acquiring a result of a feature matching between the to-be-recognized face image and at least one pre-stored face image in a data set, wherein the data set stores one or more pre-stored face images of at least one pre-recorded user allowed to use the vehicle; and if the result of the feature matching indicates that the feature matching is successful, sending to the vehicle an instruction indicating allowing controlling actions of the vehicle, otherwise, sending to the vehicle an instruction indicating refusing controlling actions of the vehicle.

A non-transitory computer storage medium provided according to another aspect of the embodiments of the disclosure is configured to store computer readable instructions, applied in a vehicle device, wherein the instructions are executed to implement the vehicle control method comprising:

acquiring, by a photographing component provided on a vehicle, a face image of a user currently requesting to use the vehicle;

acquiring a result of a feature matching between the face image and at least one pre-stored face image in a data set of the vehicle, wherein the data set stores one or more pre-stored face images of at least one pre-recorded user allowed to use the vehicle; and if the result of the feature matching indicates that the feature matching is successful, controlling actions of the vehicle to allow the user to use the vehicle, otherwise, controlling the actions of the vehicle to refuse the user to use the vehicle.

A non-transitory computer storage medium provided according to another aspect of the embodiments of the disclosure is configured to store computer readable instructions, applied in a cloud server, wherein the instructions are executed to implement the vehicle control method comprising:

receiving a to-be-recognized face image sent by a vehicle;

acquiring a result of a feature matching between the to-be-recognized face image and at least one pre-stored face image in a data set, wherein the data set stores one or more pre-stored face images of at least one pre-recorded user allowed to use the vehicle; and if the result of the feature matching indicates that the feature matching is successful, sending to the vehicle an instruction indicating allowing controlling actions of the vehicle, otherwise, sending to the vehicle an instruction indicating refusing controlling actions of the vehicle.

Based on the vehicle control method and system, the vehicle-mounted intelligent system, the electronic device, and the medium provided by the foregoing embodiments of the disclosure, by acquiring a face image of a user currently requesting to use a vehicle; acquiring a feature matching result between the face image and at least one pre-stored face image in a data set of the vehicle; and if the feature matching result indicates that the feature matching is successful, controlling vehicle actions to allow the user to use the vehicle, the rights of pre-recorded personnel are guaranteed based on the feature matching, and the feature matching can be achieved without a network, thereby overcoming the dependency on the network and further improving the safety guarantee of the vehicle.

The following further describes in detail the technical solutions of the disclosure with reference to the accompanying drawings and embodiments.

BRIEF DESCRIPTION OF DRAWINGS

The accompanying drawings constituting a part of the specification are used for describing embodiments of the disclosure and are intended to explain the principles of the disclosure together with the descriptions.

According to the following detailed descriptions, the disclosure can be understood more clearly with reference to the accompanying drawings.

DETAILED DESCRIPTION

Figure 1:
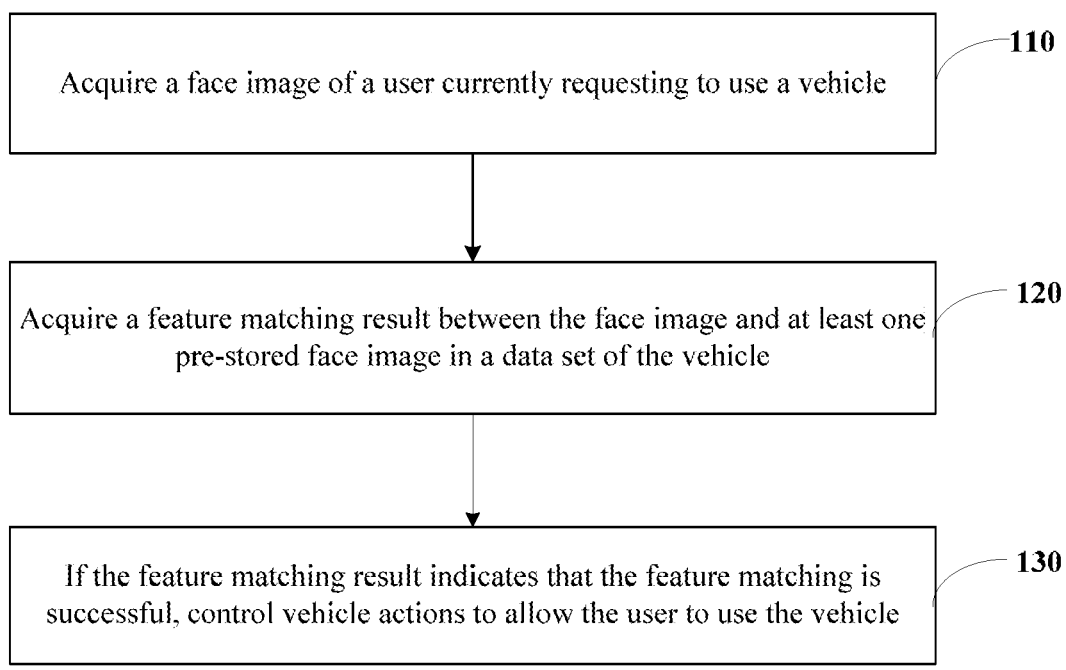
FIG. 1 illustrates a flowchart of a vehicle control method according to some embodiments of the disclosure.

Various exemplary embodiments of the disclosure are now described in detail with reference to the accompanying drawings. It should be noted that, unless otherwise stated specifically, relative arrangement of the components and steps, the numerical expressions, and the values set forth in the embodiments are not intended to limit the scope of the disclosure.

In addition, it should be understood that, for ease of description, the size of each part shown in the accompanying drawings is not drawn in actual proportion.

The following descriptions of at least one exemplary embodiment are merely illustrative actually, and are not intended to limit the disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings. It should be further noted that the symbol "/" in the disclosure means "or".

The embodiments of the present invention may be applied to electronic devices such as devices, computer systems, and servers, which may operate with numerous other general-purpose or special-purpose computing system environments or configurations. Examples of well-known devices, computing systems, environments, and/or configurations suitable for use together with the electronic devices such as devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The electronic devices such as devices, computer systems, and servers may be described in the general context of computer system executable instructions (for example, program modules) executed by the computer system. Generally, the program modules may include routines, programs, target programs, components, logics, data structures, and the like, to execute specific tasks or implement specific abstract data types. The computer system/server may be practiced in the distributed cloud computing environments in which tasks are executed by remote processing devices that are linked through a communications network. In the distributed computing environments, program modules may be located in local or remote computing system storage medium including storage devices.

FIG. 1 is a flowchart of a vehicle control method according to some embodiments of the disclosure. As shown in FIG. 1, the execution subject of the vehicle control method of this embodiment may be a vehicle device, for example, the execution subject may be a vehicle-mounted intelligent system or other devices having similar functions. The method of this embodiment includes:

110. Acquire a face image of a user currently requesting to use a vehicle.

According to one or more embodiments of the present disclosure, in order to acquire the face image of the user, image collection can be performed on an existing person by means of an image collection apparatus provided outside or inside the vehicle, so as to obtain a face image. According to one or more embodiments of the present disclosure, in order to obtain a face image with better quality, operations, such as face detection, face quality screening, and living body recognition, can be performed on the collected image.

In an optional example, the operation 110 may be executed by a processor by invoking a corresponding instruction stored in a memory, or may be executed by a user image acquisition unit 61 run by the processor.

120. Acquire a feature matching result between the face image and at least one pre-stored face image in a data set of the vehicle.

According to one or more embodiments of the present disclosure, the data set stores the pre-stored face image of at least one pre-recorded user allowed to use the vehicle.

According to one or more embodiments of the present disclosure, feature matching is performed between the face image and the pre-stored face image in the data set. Features of the face image and features of the pre-stored face image can be separately obtained by means of a convolutional neural network, and then feature matching is performed in order to recognize a pre-stored face image having the same face as the face image, thereby implementing identity recognition of the user in the collected face image.

In an optional example, the operation 120 may be executed by a processor by invoking a corresponding instruction stored in a memory, or may be executed by a matching unit 62 run by the processor.

130. If the feature matching result indicates that the feature matching is successful, control actions of the vehicle to allow the user to use the vehicle.

According to one or more embodiments of the present disclosure, the feature matching result includes two cases: the feature matching is successful and the feature matching is unsuccessful; when the feature matching is successful, it is indicated that the user is a reserved or allowed user and can use the vehicle, and at this time, actions of the vehicle are controlled to allow the user to use the vehicle.

In an optional example, the operation 130 may be executed by a processor by invoking a corresponding instruction stored in a memory, or may be executed by a vehicle control unit 63 run by the processor.

Based on the vehicle control method provided by the foregoing embodiment of the disclosure, by acquiring a face image of a user currently requesting to use a vehicle; acquiring a feature matching result between the face image and at least one pre-stored face image in a data set of the vehicle; and if the feature matching result indicates that the feature matching is successful, controlling actions of the vehicle to allow the user to use the vehicle, the rights of pre-recorded personnel are guaranteed based on the feature matching, and the feature matching can be achieved without a network, thereby overcoming the dependency on the network and further improving the safety guarantee of the vehicle.

In one or more optional embodiments, the using a vehicle may include, but is not limited to, one or any combination of: reserving use of a vehicle, driving a vehicle, riding a vehicle, cleaning a vehicle, maintaining a vehicle, repairing a vehicle, refueling a vehicle, and charging a vehicle.

Usually, for using and driving a vehicle, it is necessary to obtain the driving control rights of the vehicle, while for a ride (such as, taking a shuttle bus and online taxi-hailing service), it is only necessary to control opening of vehicle doors. There are different cases for cleaning a vehicle. In the case of cleaning a vehicle manually, the vehicle can be fixed, and the cleaning personnel need to control the opening of the vehicle doors; while in the case of cleaning a vehicle automatically, it may be necessary to provide the cleaning personnel with driving control rights of the vehicle. For maintaining and repairing a vehicle, it is only necessary to control the opening of vehicle doors for corresponding personnel. For refueling a vehicle, it is necessary to controlling opening of a fuel filler of the vehicle. When charging a vehicle (for an electric vehicle), it is necessary to perform control to allow a charging device (such as a charging gun) to connect to a battery of the vehicle.

In some embodiments, the data set stores the pre-stored face image of at least one user having reserved a ride; and the operation 130 may include: controlling opening of vehicle doors. For example, vehicle doors are opened for the user having reserved a ride (such as, online taxi-hailing service), so that the user can successfully get on the vehicle, but other non-reserved users cannot open the vehicle doors to get on the vehicle, thereby ensuring the benefits of the reserved user and the safety of the vehicle.

In some embodiments, the data set stores the pre-stored face image of at least one user having reserved use of a vehicle; and the operation 130 may include: controlling opening of vehicle doors and release of driving control rights of the vehicle. For example, when what is reserved by the reserved user is driving a vehicle (e.g., reserving vehicle rental), the user is provided with driving control rights of the vehicle, but other non-reserved users cannot enter the vehicle, and even if they enter the vehicle illegally, they still cannot drive the vehicle, thereby ensuring the safety of the vehicle.

In some embodiments, the data set stores the pre-stored face image of at least one user having been recorded and allowed to ride the vehicle; and the operation 130 may include: controlling opening of vehicle doors. For example, when the user is a user having been recorded and allowed to ride the vehicle (such as members with no driving ability corresponding to private cars and passengers of the shuttle bus), the vehicle doors are controlled to be opened for the user, so that the user can ride safely.

In some embodiments, the data set stores the pre-stored face image of at least one user having been recorded and allowed to use the vehicle; and the operation 130 includes: controlling opening of vehicle doors and release of driving control rights of the vehicle. For example, when the user is a user having been recorded and allowed to use the vehicle (such as, members with driving ability corresponding to private cars), the user is provided with driving control rights of the vehicle, but other non-reserved users cannot enter the vehicle, and even if they enter the vehicle illegally, they still cannot drive the vehicle, thereby ensuring the safety of the vehicle.

In some embodiments, the data set stores the pre-stored face image of at least one user having reserved unlocking or having been recorded and allowed to open a lock; and the operation 130 includes: controlling opening of a vehicle lock. For example, for some special vehicles (such as, electric bicycles, electric motorcycles, shared bikes), they can be used as long as the locks are opened. At this time, the user may be a reserved user (including temporary reservation or long-term reservation) or a user having been recorded and allowed to open the lock, the vehicle lock is controlled to be opened for the user, thereby ensuring the safety of the vehicle.

In some embodiments, the data set stores the pre-stored face image of at least one user having reserved refueling of a vehicle or having been recorded and allowed to refuel a vehicle; and the operation 130 includes: controlling opening of a fuel filler of the vehicle. For example, when the vehicle needs to be refueled, it is necessary to open the fuel filler. For the user having reserved refueling of a vehicle or having been recorded and allowed to refuel a vehicle, the fuel filler of the vehicle is controlled to be opened for the user in order to refuel the vehicle, thereby ensuring the safety of the vehicle in all aspects of performance.

In some embodiments, the data set stores the pre-stored face image of at least one user having reserved charging of a vehicle or having been recorded and allowed to charge a vehicle; and the operation 130 includes: performing control to allow a charging device to connect to a battery of the vehicle. For example, when the vehicle needs to be charged (such as, an electric automobile or an electric bicycle), it is necessary to perform control to allow a charging device to connect to the battery of the vehicle. For the user having reserved charging of a vehicle or having been recorded and allowed to charge a vehicle, control is performed for the user to allow the charging device to connect to the battery of the vehicle so as to charge the vehicle, thereby ensuring the safety of the battery of the vehicle.

In one or more optional embodiments, the vehicle control method further includes: controlling the vehicle to issue prompt information for indicating that the user is allowed to use the vehicle.

In order to provide better user experience, by issuing prompt information for indicating that the user is allowed to use the vehicle, the user may be prompted that the vehicle can be used, so that user waiting is avoided or the waiting time of the user is shortened, and a better service is provided for the user.

In one or more optional embodiments, the operation 110 may include:

collecting a face image of the user by means of a photographing component provided on the vehicle.

Because this embodiment provides the user with a service of using a vehicle, and may include operations inside the vehicle (such as, driving a vehicle) or operations outside the vehicle (such as, opening vehicle doors, and opening a vehicle lock), the photographing component may be provided outside or inside the vehicle, and may also be fixedly or movably provided.

In one or more optional embodiments, the vehicle control method further includes:

sending, when the vehicle is in a communication connection state with a cloud server, a data set download request to the cloud server; and receiving and storing the data set sent by the cloud server.

According to one or more embodiments of the present disclosure, the data set is generally stored in the cloud server. In this embodiment, it is necessary to implement face matching on the vehicle. In order to perform face matching without a network, the data set can be downloaded from the cloud server through the network, and the data set is stored on the vehicle. At this time, even if the network is unavailable and it is impossible to communicate with the cloud server, face matching may also be implemented on the vehicle, and the management of the data set by the vehicle is facilitated.

In one or more optional embodiments, the vehicle control method may further include:

if the feature matching result indicates that the feature matching is successful, acquiring identity information of the user according to the pre-stored face image of which the feature matching is successful; and sending the image and the identity information to the cloud server.

In this embodiment, when the feature matching is successful, it is indicated that the user is a user having reserved or having been allowed to use the vehicle, the identity information corresponding to the user can be obtained from the data set, and the face image and the identity information are sent to the cloud server. Real-time tracking can be established for the user at the cloud server (for example, when and where a certain user rides a certain vehicle). In the case that the network is available, the face image is uploaded in real time to the cloud server, so as to implement analysis and statistics of the vehicle use state of the user.

In one or more optional embodiments, the vehicle control method further includes: acquiring a living body detection result of the face image; and the operation 130 may include:

controlling, according to the feature matching result and the living body detection result, actions of the vehicle to allow the user to use the vehicle.

In this embodiment, the living body detection is used for determining whether the image is from a real person (i.e., a living person), the authentication of the driver may be more accurate through the living body detection. This embodiment does not define the specific approaches of the living body detection. For example, the living body detection may be implemented by three-dimensional information depth analysis of the image, facial optical flow analysis, Fourier spectrum analysis, edge or reflection anti-counterfeiting clue analysis, comprehensive analysis of multiple video image frames in a video stream, and the like, and therefore, the details are not described herein again.

In one or more optional embodiments, the vehicle control method further includes:

sending, when the vehicle is in a communication connection state with a mobile device, a data set download request to the mobile device; and receiving and storing the data set sent by the mobile device.

According to one or more embodiments of the present disclosure, the data set is acquired from the cloud server and sent to the vehicle by the mobile device upon reception of the data set download request.

According to one or more embodiments of the present disclosure, the mobile device may be a mobile phone, a PAD, or other terminal devices on the vehicle. Upon reception of the data set download request, the mobile device sends the data set download request to the cloud server, and then obtains the data set to be sent to the vehicle. When the mobile device downloads the data set, the built-in network of the mobile device (e.g., 2G network, 3G network, 4G network, and the like) may be applied, thereby avoiding the problem that the vehicle cannot download the data set from the cloud server without a network and thus cannot perform face matching.

In one or more optional embodiments, the vehicle control method further includes: if the feature matching result indicates that the feature matching is unsuccessful, controlling actions of the vehicle to refuse the user to use the vehicle.

In this embodiment, unsuccessful feature matching indicates that the user has not reserved or has not been allowed to user the vehicle. At this time, in order to guarantee the benefits of the user having reserved or having been allowed to user the vehicle, the vehicle will refuse the user to use it.

According to one or more embodiments of the present disclosure, the vehicle control method further includes:

issuing prompt reservation information;

receiving a reservation request of the user according to the prompt reservation information, the reservation request of the user including a reserved face image of the user; and establishing a data set according to the reserved face image.

In this embodiment, a reservation request sent by the user is received by the vehicle, the reserved face images of the user are stored, a data set is established on the vehicle based on the reserved face images, and individual face matching of the vehicle is implemented by means of the data set, without downloading the data set from the cloud server.

In one or more optional embodiments, the vehicle control method further includes:

performing user state detection based on the face image; and outputting a forewarning prompt for an abnormal state according to the result of the user state detection.

In some of the embodiments, the result of the user state detection may be output.

In some other embodiments, when the user is a driver, intelligent driving control may be performed on the vehicle according to the result of the user state detection.

In still some other embodiments, when the user is a driver, the result of the user state detection may be output, and at the same time, intelligent driving control may be performed on the vehicle according to the result of the user state detection.

According to one or more embodiments of the present disclosure, the result of the user state detection may be output locally and/or the result of the user state detection may be output remotely. The result of the user state detection is output locally, i.e., the result of the user state detection is output by a user state detection apparatus or a user monitoring system, or the result of the user state detection is output to a central control system in the vehicle, so that intelligent driving control is performed on the vehicle based on the result of the user state detection. The result of the user state detection is output remotely, for example, the result of the user state detection may be sent to the cloud server or a management node so that the cloud server or the management node collects, analyzes, and/or manages the result of the user state detection, or the vehicle is remotely controlled based on the result of the user state detection.

In an optional example, the outputting a forewarning prompt for an abnormal state according to the result of the user state detection may be executed by a processor by invoking a corresponding instruction stored in a memory, or may be executed by an output module run by the processor.

In an optional example, the foregoing operation may be executed by a processor by invoking a corresponding instruction stored in a memory, or may be executed by a user state detection unit run by the processor.

In some embodiments, the user state detection, for example, may include, but is not limited to, any one or more of: user fatigue state detection, user distraction state detection, user's predetermined distraction action detection, and user gesture detection. Thus, the result of the user state detection correspondingly includes, but is not limited to, any one or more of: the result of the user fatigue state detection, the result of the user distraction state detection, the result of the user's predetermined distraction action detection, and the result of the user gesture detection.

In this embodiment, the predetermined distraction action may be any distraction action that may distract the user, for example, a smoking action, a drinking action, an eating action, a calling action, an entertainment action and the like. The eating action is eating food, for example, fruit, snacks and the like. The entertainment action is any action executed with the aid of an electronic device, for example, sending messages, playing games, singing and the like. The electronic device is, for example, a mobile terminal, a handheld computer, a game machine and the like.

Based on the user state detection method provided in the foregoing embodiment of the disclosure, the user state detection may be performed on the face image, and the result of the user state detection is output, so as to implement real-time detection of the vehicle use state of the user, so that corresponding measures are taken in time when the vehicle use state of the user is poor, thereby facilitating ensuring safe driving, and reducing or avoiding road traffic accidents.

Figure 2:
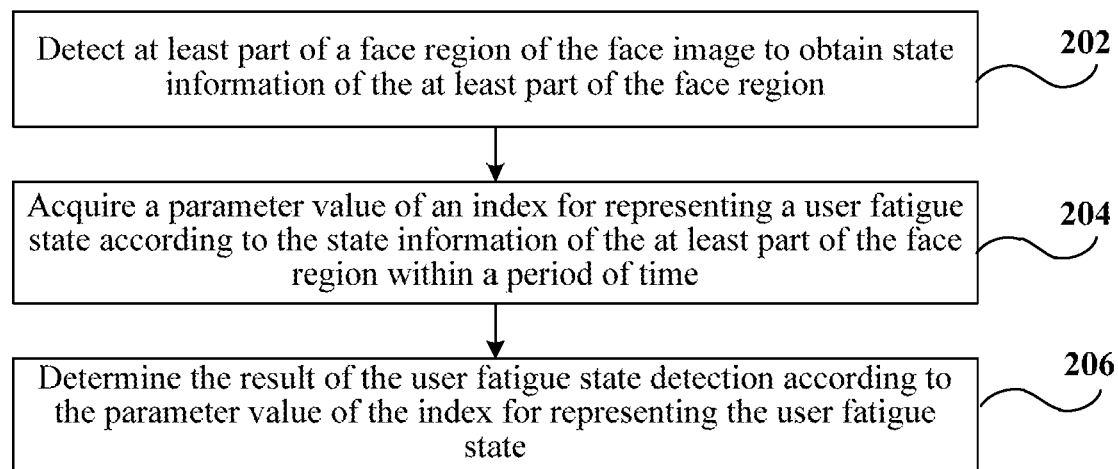
FIG. 2 illustrates a flowchart of performing user fatigue state detection based on a face image in some embodiments of the disclosure.

FIG. 2 is a flowchart of performing user fatigue state detection based on a face image in some embodiments of the disclosure. In an optional example, the embodiment shown in FIG. 2 may be executed by a processor by invoking a corresponding instruction stored in a memory, or may be executed by a state detection unit run by the processor. As shown in FIG. 2, the method for performing user fatigue state detection based on a face image may include:

202: Detect at least part of a face region of the face image to obtain state information of the at least part of the face region.

In an optional example, the at least part of the face region may include at least one of a user's eye region, a user's mouth region, and a user's entire face region. The state information of the at least part of the face region may include any one or more of: eye open/closed state information and mouth open/closed state information.

According to one or more embodiments of the present disclosure, the eye open/closed state information may be used for detecting eye closure of the user, for example, detecting whether the user's eyes are semi-closed ("semi-" represents the state that the eyes are not completely closed, for example, squinted in the sleepy state and the like), whether the user closes the eyes, the number of eye closures, the eye closure amplitude and the like. According to one or more embodiments of the present disclosure, the eye open/closed state information may be the information obtained by normalization processing of the amplitude of eye opening. The mouth open/closed state information may be used for yawn detection of the user, for example, detecting whether the user yawns, and the number of yawns and the like. According to one or more embodiments of the present disclosure, the mouth open/closed state information may be the information obtained by normalization processing of the amplitude of mouth opening.

In an optional example, face key point detection may be performed on the face image, and computation is performed directly using an eye key point in the detected face key points, to obtain the eye open/closed state information according to the computation result.

In an optional example, the eyes in the face image are first positioned using the eye key point in the face key points (for example, the coordinate information of the eye key point in the face image) to obtain an eye image, and an upper eyelid line and a lower eyelid line are obtained using the eye image; and the eye open/closed state information is obtained by computing the spacing between the upper eyelid line and the lower eyelid line.

In an optional example, computation is performed directly using a mouth key point in the face key points, so as to obtain the mouth open/closed state information according to the computation result.

In an optional example, the mouth in the face image is first positioned using the mouth key point in the face key points (for example, the coordinate information of the mouth key point in the face image) to obtain a mouth image through a mode such as shearing, and an upper lip line and a lower lip line are obtained using the mouth image; and the mouth open/closed state information is obtained by computing the spacing between the upper lip line and the lower lip line.

204: Acquire a parameter value of an index for representing a user fatigue state according to the state information of the at least part of the face region within a period of time.

In some optional examples, the index for representing the user fatigue state for example may include, but is not limited to, any one or more of: an eye closure degree and a yawning degree.

In an optional example, the parameter value of the eye closure degree, for example, may include, but is not limited to, any one or more of: the number of eye closures, eye closure frequency, eye closure duration, eye closure amplitude, the number of eye semi-closures, and eye semi-closure frequency; and/or the parameter value of the yawning degree, for example, may include, but is not limited to, any one or more of: a yawning state, the number of yawns, yawning duration, and yawning frequency.

206. Determine the result of the user fatigue state detection according to the parameter value of the index for representing the user fatigue state.

According to one or more embodiments of the present disclosure, the result of the user fatigue state detection may include: no fatigue state is detected, and the fatigue state. Alternatively, when the user is a driver, the result of the user fatigue state detection may also be the fatigue driving degree, where the fatigue driving degree may include: normal driving level (also called non-fatigue driving level) and fatigue driving level. The fatigue driving level may be one level, or may be divided into multiple different levels, for example, the fatigue driving level may be divided into fatigue driving prompt level (also called mild fatigue driving level) and fatigue driving warning level (also called severe fatigue driving level). Certainly, the fatigue driving degree may be divided into more levels, for example, mild fatigue driving level, moderate fatigue driving level, and severe fatigue driving level and the like. This embodiment does not limit the different levels included in the fatigue driving degree.

Figure 3:
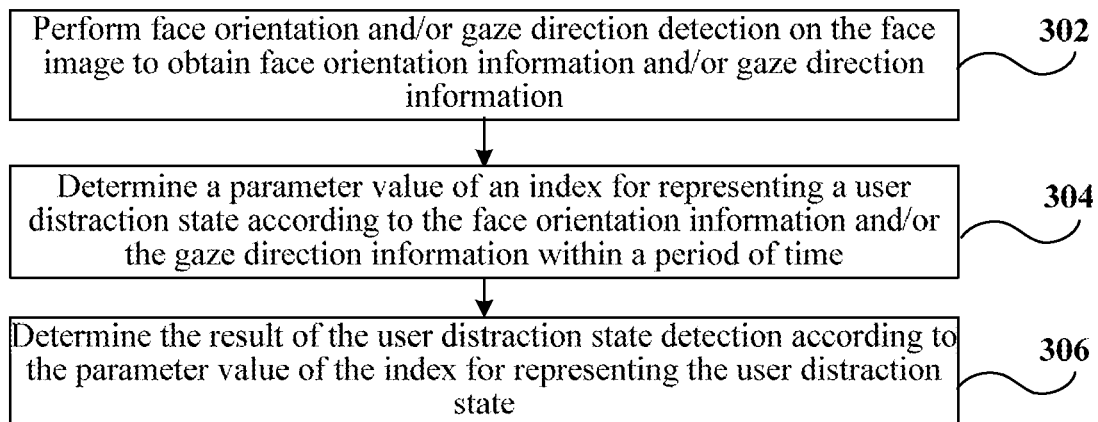
FIG. 3 illustrates a flowchart of performing user distraction state detection based on a face image in some embodiments of the disclosure.

FIG. 3 is a flowchart of performing user distraction state detection based on a face image in some embodiments of the disclosure. In an optional example, the embodiment shown in FIG. 3 may be executed by a processor by invoking a corresponding instruction stored in a memory, or may be executed by a state detection unit run by the processor. As shown in FIG. 3, the method for performing user distraction state detection based on a face image may include:

302. Perform face orientation and/or gaze direction detection on the face image to obtain face orientation information and/or gaze direction information.

According to one or more embodiments of the present disclosure, the face orientation information may be used for determining whether the face direction of the user is normal, for example, determining whether the user turns his/her face or turns around and the like. According to one or more embodiments of the present disclosure, the face orientation information may be the included angle between the front of the face of the user and the front of the vehicle used by the user. According to one or more embodiments of the present disclosure, the gaze direction information may be used for determining whether the gaze direction of the user is normal, for example, determining whether the user gazes ahead and the like. The gaze direction information may be used for determining whether a deviation phenomenon occurs to the gaze of the user. According to one or more embodiments of the present disclosure, the gaze direction information may be the included angle between the gaze of the user and the front of the vehicle used by the user.

304: Determine a parameter value of an index for representing a user distraction state according to the face orientation information and/or the gaze direction information within a period of time.

In some optional examples, the index for representing the user fatigue state, for example, may include, but are is limited to, any one or more of: a face orientation deviation degree and a gaze deviation degree. In an optional example, the parameter value of the face orientation deviation degree, for example, may include, but is not limited to, any one or more of: the number of head turns, head turning duration, and head turning frequency; and/or the parameter value of the gaze deviation degree, for example, may include, but is not limited to, any one or more of: a gaze direction deviation angle, gaze direction deviation duration, and gaze direction deviation frequency.

In an optional example, the gaze deviation degree, for example, may include: at least one of whether the gaze deviates, whether the gaze severely deviates and the like. The face orientation deviation degree (also called the face turning degree or the head turning degree), for example, may include: at least one of whether the head turns, whether the head turns for a short time, and whether the head turns for a long time.

In an optional example, if it is determined that the face orientation information is larger than the first orientation, and the phenomenon of larger than the first orientation continues for N1 frames (for example, continuing for 9 frames, 10 frames or the like), it is determined that the user has experienced a long-time large-angle head turning, and the long-time large-angle head turning can be recorded, or the duration of this head turning may be recorded; and if it is determined that the face orientation information is not larger than the first orientation but is larger than the second orientation, and the phenomenon of not larger than the first orientation but larger than the second orientation continues for N1 frame (for example, lasting for 9 frames, 10 frames or the like), it is determined that the user has experienced a long-time small-angle head turning, and the small-angle head turning can be recorded, and the duration of this head turning can also be recorded.

In an optional example, if it is determined that the included angle between the gaze direction information and the front of the vehicle is greater than a first included angle, and the phenomenon of greater than the first included angle continues for N2 frame (for example, continuing for 8 frames, 9 frames or the like), it is determined that the user has experienced a severe gaze deviation, and the severe gaze deviation can be recorded, or the duration of this severe gaze deviation can be recorded; and if it is determined that the included angle between the gaze direction information and the front of the vehicle is not greater than a first included angle but is greater than a second included angle, and the phenomenon of not greater than the first included angle but greater than the second included angle continues for N2 frame (for example, continuing for 8 frames, 9 frames or the like), it is determined that the user has experienced a gaze deviation, and the gaze deviation can be recorded, or the duration of this gaze deviation can be recorded.

In an optional example, the values of the first orientation, the second orientation, the first included angle, the second included angle, N1, and N2 may be set according to actual situations, and this embodiment does not limit the values.

306: Determine the result of the user distraction state detection according to the parameter value of the index for representing the user distraction state.

According to one or more embodiments of the present disclosure, the result of the user distraction state detection, for example, may include: the user's attention is focused (the user is not distracted), and the user is distracted; or the result of the user distraction state detection may be the user distraction level, which for example may include: the user's attention is focused (the user is not distracted), the user is slightly distracted, and the user is moderately distracted, the user is severely distracted and the like. The user distraction level may be determined by a preset condition that the parameter value of the index for representing the user distraction state satisfies. For example, if the gaze direction deviation angle and the face orientation deviation angle are both less than the first preset angle, the user distraction level is that the user's attention is focused; if either of the gaze direction deviation angle and the face orientation deviation angle is greater than or equal to the first preset angle, and the duration is greater than the first preset duration and less than or equal to the second preset duration, the user is slightly distracted; if either of the gaze direction deviation angle and the face orientation deviation angle is greater than or equal to the first preset angle, and the duration is greater than the second preset duration and less than or equal to the third preset duration, the user is moderately distracted; and if either of the gaze direction deviation angle and the face orientation deviation angle is greater than or equal to the first preset angle, and the duration is greater than the third preset duration, the user is severely distracted, where the first preset duration is less than the second preset duration, and the second preset duration is less than the third preset duration.

This embodiment determines the parameter value of the index for representing the user distraction state by detecting the face orientation and/or gaze direction of the user image when the user is a driver, determines the result of the user distraction state detection based on the parameter value to determine whether the user concentrates on driving; the driving attention degree is quantized into at least one of the gaze deviation degree and the head turning degree by quantizing the index for representing the user distraction state, which is beneficial to evaluate the driving attention state of the user in time and objectively.

In some embodiments, the performing face orientation and/or gaze direction detection on the face image in operation 302 may include:

detecting face key points of the face image; and
performing face orientation and/or gaze direction detection according to the face key points.

Since the face key points generally contain feature information of head pose, in some optional examples, the performing face orientation detection according to face key points to obtain the face orientation information includes: obtaining feature information of head pose according to the face key points; and determining the face orientation (also called head pose) information according to the feature information of the head pose. The face orientation information here may represent, for example, the direction and angle of face turning, and the turning direction here may be turn to the left, turn to the right, turn down, and/or turn up and the like.

In an optional example, whether the user concentrates on driving can be determined through face orientation. The face orientation (head pose) may be represented as (yaw, pitch), where yaw represents a horizontal deflection angle (a yaw angle) and a vertical deflection angle (a pitch angle) of the head in normalized spherical coordinates (a camera coordinate system where a camera is located). When the horizontal deflection angle and/or the vertical deflection angle are greater than a preset angle threshold, and the duration is greater than a preset time threshold, it can be determined that the result of the user distraction state detection is that the user is distracted.

In an optional example, the face orientation information of at least one user image can be obtained by using a corresponding neural network. For example, the detected face key points are input to a first neural network, the feature information of the head pose is extracted via the first neural network based on the received face key points and is input to a second neural network; and head pose estimation is performed via the second neural network based on the feature information of the head pose to obtain the face orientation information.

In the case of using a neural network that is relatively mature and has good real-time characteristics for extracting the feature information of the head pose, and a neural network for estimating the face orientation to obtain the face orientation information, a video captured by the camera can detect the face orientation information corresponding to at least one image frame (i.e., at least one user image frame) in the video accurately and in time, thus improving the accuracy of determining the user's attention degree.

In some optional examples, the performing gaze direction detection according to face key points to obtain the gaze direction information includes: determining a pupil edge location according to an eye image positioned by an eye key point in the face key points, and computing a pupil center location according to the pupil edge location; and computing the gaze direction information according to the pupil center location and an eye center location, for example, computing vectors of the pupil center location and the eye center location in the eye image, the vectors being the gaze direction information.

In an optional example, whether the user concentrates on driving can be determined through the gaze direction. The gaze direction may be represented as (yaw, pitch), where yaw represents a horizontal deflection angle (a yaw angle) and a vertical deflection angle (a pitch angle) of the gaze in the normalized spherical coordinates (a camera coordinate system where a camera is located). When the horizontal deflection angle and/or the vertical deflection angle are greater than a preset angle threshold, and the duration is greater than a preset duration threshold, it can be determined that the result of the user distraction state detection is that the user is distracted.

In an optical example, the determining the pupil edge location according to an eye image positioned by an eye key point in the face key points may be implemented in the following mode: detecting, based on a third neural network, a pupil edge location of an eye region image in the images divided according to the face key points, and obtaining the pupil edge location according to information output by the third neural network.

Figure 4:
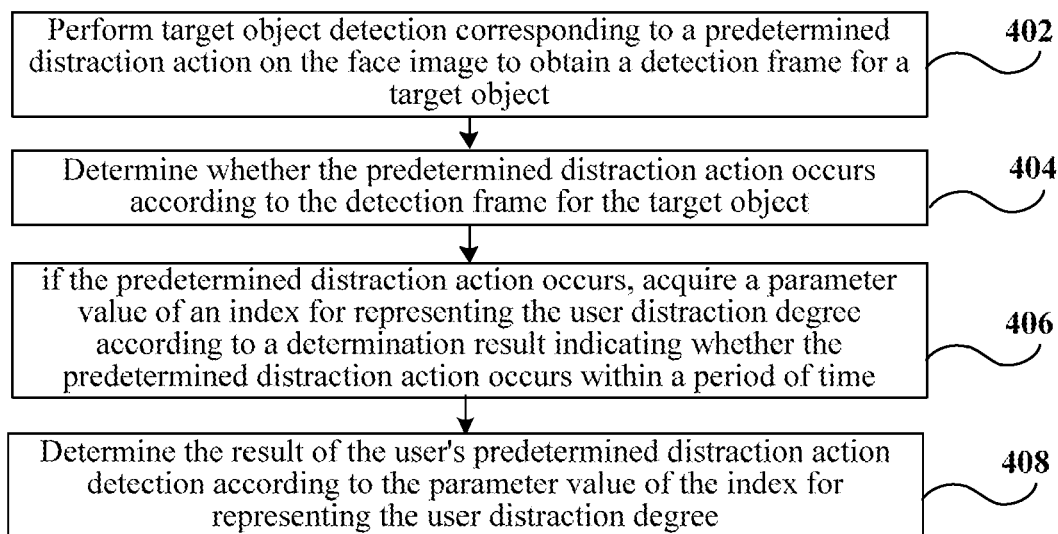
FIG. 4 illustrates a flowchart of performing user's predetermined distraction action detection based on a face image in some embodiments of the disclosure.

FIG. 4 is a flowchart of performing user's predetermined distraction action detection based on a face image in some embodiments of the disclosure. In an optional example, the embodiment shown in FIG. 4 may be executed by a processor by invoking a corresponding instruction stored in a memory, or may be executed by a state detection unit run by the processor. As shown in FIG. 4, the method for performing user's predetermined distraction action detection based on a face image may include:

402: Perform target object detection corresponding to a predetermined distraction action on the face image to obtain a detection frame for a target object.

404: Determine whether the predetermined distraction action occurs according to the detection frame for the target object.

In this embodiment, the predetermined distraction action detection is performed on the user by detecting the target object corresponding to the predetermined distraction action and determining whether the distraction action occurs according to the detection frame for the detected target object, whether the user is distracted can be determined, which is contributive to obtain the accurate result of the user's predetermined distraction action detection, thereby facilitating improving the accuracy of the result of the user state detection.

For example, when the predetermined distraction action is a smoking action, the operations 402-404 may include: performing face detection on the user image via a fourth neural network to obtain a face detection frame, and extracting feature information of the face detection frame; and determining whether the smoking action occurs via the fourth neural network according to the feature information of the face detection frame.

For another example, when the predetermined distraction action is an eating action/drinking action/calling action/entertainment action (i.e., an eating action and/or a drinking action and/or a calling action and/or an entertainment action), the operations 402-404 may include: performing preset target object detection corresponding to the eating action/drinking action/calling action/entertainment action on the user image via a fifth neural network to obtain a detection frame for preset target objects, where the preset target objects include: hands, mouth, eyes, and a target item; the target item for example may include, but is not limited to, any one or more types: containers, foods, and electronic devices; determining a detection result of the predetermined distraction action according to the detection frame for the preset target objects, the detection result of the predetermined distraction action including one of: no eating action/drinking action/calling action/entertainment action occurs, the eating action occurs, the drinking action occurs, the calling action occurs, and the entertainment action occurs.

In some optional examples, when the predetermined distraction action is an eating action/drinking action/calling action/entertainment action (i.e., an eating action and/or a drinking action and/or a calling action and/or an entertainment action), the determining a detection result of the predetermined distraction action according to the detection frame for the preset target objects may include: determining the result of the predetermined distraction action detection according to whether a detection frame for the hands, a detection frame for the mouth, a detection frame for the eyes, and a detection frame for the target item are detected, and according to whether the detection frame for the hands overlaps the detection frame for the target item, the type of the target item, and whether the distance between the detection frame for the target item and the detection frame for the mouth or the detection frame for the eyes satisfies preset conditions.

According to one or more embodiments of the present disclosure, if the detection frame for the hands overlaps the detection frame for the target item, the type of the target item is a container or food, and the detection frame for the target item overlaps the detection frame for the mouth, it is determined that the eating action or the drinking action occurs; and/or if the detection frame for the hands overlaps the detection frame for the target item, the type of the target item is an electronic device, and the minimum distance between the detection frame for the target item and the detection frame for the mouth is less than a first preset distance, or the minimum distance between the detection frame for the target item and the detection frame for the eyes is less than a second preset distance, it is determined that the entertainment action or the calling action occurs.

In addition, if the detection frame for the hands, the detection frame for the mouth, and the detection frame for any one of the target items are not detected simultaneously, and the detection frame for the hands, the detection frame for the eyes, and the detection frame for any one of the target items are not detected simultaneously, it is determined that the result of the distraction action detection is that no eating action, drinking action, calling action, and entertainment action is detected; and/or if the detection frame for the hands does not overlap the detection frame for the target item, it is determined that the result of the distraction action detection is that no eating action, drinking action, calling action, and entertainment action is detected; and/or if the type of the target item is a container or food, and the detection frame for the target item does not overlap the detection frame for the mouth, and/or the type of the target item is electronic device, and the minimum distance between the detection frame for the target item and the detection frame for the mouth is not less than the first preset distance, or the minimum distance between the detection frame for the target item and the detection frame for the eyes is not less than the second preset distance, it is determined that the result of the distraction action detection is that no eating action, drinking action, calling action, and entertainment action is detected.

In addition, the foregoing embodiment of performing predetermined distraction action detection on the user image may further include: if the result of the user's predetermined distraction action detection is that a predetermined distraction action is detected, prompting the detected predetermined distraction action, for example, if a smoking action is detected, prompting the detection of smoking; if a drinking action is detected, prompting the detection of drinking; and if a calling action is detected, prompting the detection of the calling action.

In an optional example, the operations of prompting the detected predetermined distraction actions may be executed by a processor by invoking a corresponding instruction stored in a memory, or may be executed by a prompt module run by the processor.

In addition, with reference to FIG. 4 again, another embodiment of performing user's predetermined distraction action detection on the user image may further selectively include:

406: If the predetermined distraction action occurs, acquire a parameter value of an index for representing the user's distraction degree according to a determination result indicating whether the predetermined distraction action occurs within a period of time.

According to one or more embodiments of the present disclosure, the index for representing the user distraction degree, for example, may include, but is not limited to, any one or more of: the number of occurrences of the predetermined distraction action, duration of the predetermined distraction action, and frequency of the predetermined distraction action. For example, the number of occurrences of the smoking action, the duration of the smoking action, and the frequency of the smoking action; the number of occurrences of the drinking action, the duration of the drinking action, and the frequency of the drinking action; the number of occurrences of the calling action, the duration of the calling action, and the frequency of the calling action, and the like.

408: Determine the result of the user's predetermined distraction action detection according to the parameter value of the index for representing the user distraction degree.

According to one or more embodiments of the present disclosure, the result of the user's predetermined distraction action detection may include: no predetermined distraction action is detected, and a predetermined distraction action is detected. In addition, the result of the user's predetermined distraction action detection may also be the distraction level, for example, the distraction level may be divided into: non-distraction level (also called concentrated driving level), distraction driving prompt level (also called mild distraction driving level), and distraction driving warning level (also called severe distraction driving level). Certainly, the distraction level may also be divided into more levels, such as, non-distraction level driving, mild distraction driving level, moderate distraction driving level, severe distraction driving level and the like. Certainly, the distraction level in at least one embodiment of the disclosure may also be divided according to other situations, and is not limited to the foregoing level division situation.

In an optional example, the distraction level may be determined by a preset condition that the parameter value of the index for representing the user distraction degree satisfies. For example, if no predetermined distraction action is detected, the distraction level is the non-distraction level (also called concentrated driving level); if it is detected that the duration of the predetermined distraction action is less than a first preset duration, and the frequency is less than a first preset frequency, the distraction level is the mild distraction driving level; and if it is detected that the duration of the predetermined distraction action is greater than the first preset duration, and/or the frequency is greater than the first preset frequency, the distraction level is the severe distraction driving level.

In some embodiments, the user state detection method may further include: outputting distraction prompt information according to the result of the user distraction state detection and/or the result of the user's predetermined distraction action detection.

According to one or more embodiments of the present disclosure, if the result of the user distraction state detection is that the user is distracted, or is the user distraction level, and/or the result of the user's predetermined distraction action detection is that a predetermined distraction action is detected, the distraction prompt information may be output to remind the user of concentration on driving.

In an optional example, the operation of outputting the distraction prompt information according to the result of the user distraction state detection and/or the result of the user's predetermined distraction action detection may be executed by a processor by invoking a corresponding instruction stored in a memory, or may be executed by a prompt unit run by the processor.

Figure 5:
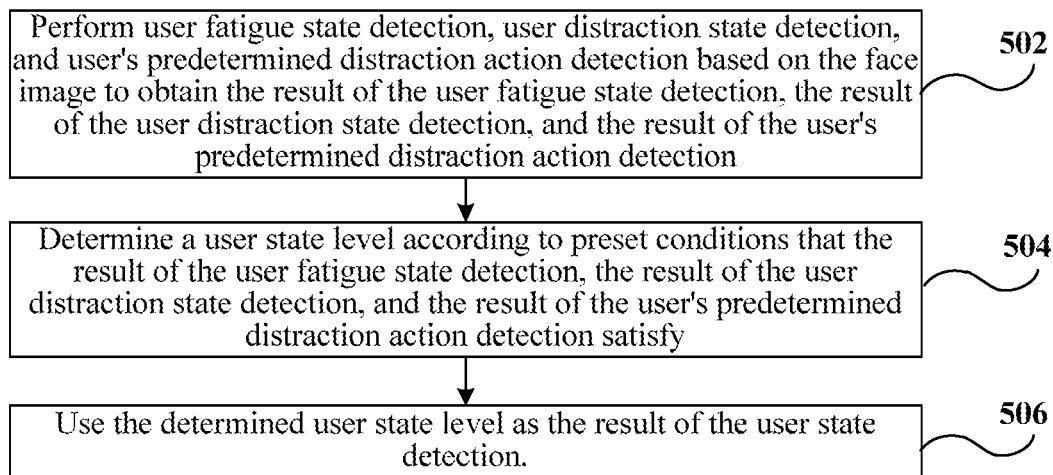
FIG. 5 illustrates a flowchart of a user state detection method according to some embodiments of the disclosure.

FIG. 5 is a flowchart of a user state detection method according to some embodiments of the disclosure. In an optional example, the embodiment shown in FIG. 5 may be executed by a processor by invoking a corresponding instruction stored in a memory, or may be executed by a state detection unit run by the processor. As shown in FIG. 5, the user state detection method of this embodiment includes:

502: Perform user fatigue state detection, user distraction state detection, and user's predetermined distraction action detection based on the face image to obtain the result of the user fatigue state detection, the result of the user distraction state detection, and the result of the user's predetermined distraction action detection.

504: Determine a user state level according to preset conditions that the result of the user fatigue state detection, the result of the user distraction state detection, and the result of the user's predetermined distraction action detection satisfy.

506: Use the determined user state level as the result of the user state detection.

In an optional example, each user state level corresponds to a preset condition; the preset conditions that the result of the user fatigue state detection, the result of the user distraction state detection and the result of the user's predetermined distraction action detection satisfy may be determined in real time; and the user state level corresponding to the satisfied preset condition may be determined as the result of the user state detection of the user. When the user is a driver, the user state level, for example, may include: the normal driving state (also called concentrated driving level), the driving prompt state (the driving state is poor), and the driving warning state (the driving state is very poor).

In an optional example, the foregoing embodiment shown in FIG. 5 may be executed by a processor by invoking a corresponding instruction stored in a memory, or may be executed by an output module run by the processor.

For example, when the user is a driver, the preset condition corresponding to the normal driving level (also called concentrated driving level) may include:

condition 1: the result of the user fatigue state detection is that no fatigue state is detected, or is the non-fatigue driving level;

condition 2: the result of the user distraction state detection is that the user's attention is focused; and condition 3: the result of the user's predetermined distraction action detection is that no predetermined distraction action is detected, or is the non-distraction level.

If conditions 1, 2, and 3 are all satisfied, the driving state level is the normal driving state (also called concentrated driving level).

For example, when the user is a driver, the preset condition corresponding to the driving prompt state (the driving state is poor) may include:

condition 11: the result of the user fatigue state detection is: the fatigue driving prompt level (also called the mild fatigue driving level);

condition 22: the result of the user distraction state detection is that the user is slightly distracted; and condition 33: the result of the user's predetermined distraction action detection is: the distraction driving prompt level (also called the mild distraction driving level).

If any one of conditions 11, 22, and 33 is satisfied, and the results in other conditions do not reach the preset conditions corresponding to the more severe fatigue driving level, the attention distraction level, and the distraction level, the driving state level is the driving prompt state (the driving state is poor).

For example, when the user is a driver, the preset condition corresponding to the driving warning state (the driving state is very poor) may include:

condition 111: the result of the user fatigue state detection is: the fatigue driving prompt level (also called the severe fatigue driving level);

condition 222: the result of the user distraction state detection is that the user is severely distracted; and condition 333: the result of the user's predetermined distraction action detection is: the distraction driving warning level (also called the is severe distraction driving level).

If any one of conditions 111, 222, and 333 is satisfied, the driving state level is the driving warning state (the driving state is very poor).

In some embodiments, the user state detection method may further include:

executing a control operation corresponding to the result of the user state detection.

In an optional example, the executing a control operation corresponding to the result of the user state detection may be executed by a processor by invoking a corresponding instruction stored in a memory, or may be executed by a control unit run by the processor.

According to one or more embodiments of the present disclosure, the executing a control operation corresponding to the result of the user state detection may include at least one of:

when the user is a driver, if the determined result of the user state detection satisfies a predetermined prompt/warning condition, e.g., satisfying a preset condition corresponding to the prompt state (e.g., the driving state is poor) or the state level is the driving prompt state (e.g., the driving state is poor), outputting prompt/warning information corresponding to the predetermined prompt/warning condition, e.g., prompting the user with sound (e.g., voice or ringing, and the like)/light (e.g., light up or light flickering, and the like)/vibration and the like to call for attention of the user so that the user returns the distracted attention to driving or takes a rest, thereby realizing safe driving and avoiding road traffic accidents; and/or when the user is a driver, if the determined result of the user state detection satisfies a predetermined driving mode switching condition, e.g., satisfying a preset condition corresponding to the driving warning state (e.g., the driving state is very poor), or the driving state level is the distraction driving warning level (also called the severe distraction driving level), switching the driving mode to an automatic driving mode to implement safe driving and avoid road traffic accidents; moreover, prompting the user with sound (e.g., voice or ringing and the like)/light (light up or light flickering and the like)/vibration and the like to call for attention of the user so that the user returns the distracted attention to driving or takes a rest; and/or if the determined result of the user state detection satisfies a predetermined information sending condition, sending predetermined information to a predetermined contact or establishing a communication connection with the predetermined contact, for example, it is agreed that when the user makes certain or some actions, it is indicated that the user is in a dangerous state or needs help; when these actions are detected, sending the predetermined information (such as, alarm information, prompt information or dial-up call) to the predetermined contact (for example, alarm call, recent contact person's number or the set emergency contact person's number), and establishing a communication connection (e.g., video call, voice call or calling) with the predetermined contact directly by means of a vehicle-mounted device to guarantee the user's personal and/or property safety.

In one or more optional embodiments, the vehicle control method further includes: sending at least part of the result of the user state detection to the cloud server.

According to one or more embodiments of the present disclosure, the at least part of the result includes: abnormal vehicle use state information determined according to the user state detection.

Sending some or all results obtained by the user state detection to the cloud server may realize backup of the abnormal vehicle use state information. Since there is no need to record the normal driving state, only the abnormal vehicle use state information is sent to the cloud server in this embodiment. When the obtained result of the user state detection includes normal vehicle use state information and abnormal vehicle use state information, some results are transmitted, i.e., only the abnormal vehicle use state information is sent to the cloud server. Moreover, when all results of the user state detection are abnormal vehicle use state information, all abnormal vehicle use state information is sent to the cloud server.

According to one or more embodiments of the present disclosure, the vehicle control method further includes: storing face images corresponding to the abnormal vehicle use state information; and/or sending the face images corresponding to the abnormal vehicle use state information to the cloud server.

In this embodiment, by saving the face images corresponding to the abnormal vehicle use state information locally on the vehicle, the evidence can be saved; according to the saved face images, if safety or other problems occur subsequently due to the abnormal vehicle use state of the user, responsibility determination may be performed by invoking the saved face images; and if the abnormal vehicle use state related to the problem is found in the saved face images, the responsibility of the user can be determined. Moreover, in order to prevent data on the vehicle from being accidentally deleted or deliberately deleted, the face images corresponding to the abnormal vehicle use state information may be uploaded to the cloud server for backup. When the information is needed, the face images may be downloaded from the cloud server to the vehicle for viewing, or be downloaded from the cloud server to other clients for viewing.

A person of ordinary skill in the art may understand that all or some steps of implementing the forgoing embodiments of the method may be achieved by a program by instructing related hardware; the program can be stored in a computer readable storage medium; when the program is executed, steps including the foregoing embodiments of the method are executed. Moreover, the storage medium includes at least one medium capable of storing program code, such as ROM, RAM, a magnetic disk, or an optical disk.

Figure 6:
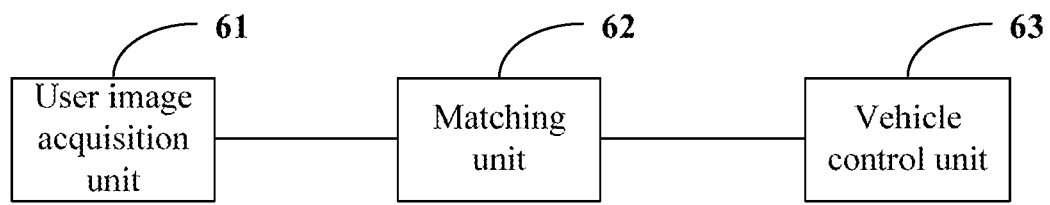
FIG. 6 illustrates a schematic structural diagram of a vehicle-mounted intelligent system according to some embodiments of the disclosure.

FIG. 6 is a schematic structural diagram of a vehicle-mounted intelligent system according to some embodiments of the disclosure. The vehicle-mounted intelligent system of the embodiment can be configured to implement the foregoing embodiments of the vehicle control methods of the disclosure. As shown in FIG. 6, the vehicle-mounted intelligent system of this embodiment includes:

a user image acquisition unit 61, configured to acquire a face image of a user currently requesting to use a vehicle.

A matching unit 62, configured to acquire a feature matching result between the face image and at least one pre-stored face image in a data set of the vehicle.

According to one or more embodiments of the present disclosure, the data set stores the pre-stored face image of at least one user having been recorded and allowed to use the vehicle.

A vehicle control unit 63, configured to control actions of the vehicle to allow the user to use the vehicle, if the feature matching result indicates that the feature matching is successful.

Based on the vehicle-mounted intelligent system provided by the foregoing embodiment of the disclosure, by acquiring a face image of a user currently requesting to use a vehicle; acquiring a feature matching result between the face image and at least one pre-stored face image in a data set of the vehicle; and if the feature matching result indicates that the feature matching is successful, controlling actions of the vehicle to allow the user to use the vehicle, the rights of pre-recorded personnel are guaranteed based on the feature matching, and the feature matching can be achieved without a network, thereby overcoming the dependency on the network and further improving the safety guarantee of the vehicle.

In one or more optional embodiments, the using a vehicle includes one or any combination of: reserving use of a vehicle, driving a vehicle, riding a vehicle, cleaning a vehicle, maintaining a vehicle, repairing a vehicle, refueling a vehicle, and charging a vehicle.

In some embodiments, the data set stores the pre-stored face image of at least one user having reserved a ride; and the vehicle control unit 63 is configured to control opening of vehicle doors.

In some embodiments, the data set stores the pre-stored face image of at least one user having reserved use of a vehicle; and the vehicle control unit 63 is configured to control opening of vehicle doors and release of driving control rights of the vehicle.

In some embodiments, the data set stores the pre-stored face image of at least one user having been recorded and allowed to ride the vehicle; and the vehicle control unit 63 is configured to control opening of vehicle doors.

In some embodiments, the data set stores the pre-stored face image of at least one user having been recorded and allowed to use the vehicle; and the vehicle control unit 63 is configured to control opening of vehicle doors and release of driving control rights of the vehicle.

In some embodiments, the data set stores the pre-stored face image of at least one user having reserved unlocking or having been recorded and allowed to open a lock; and the vehicle control unit 63 is configured to control opening of a vehicle lock.

In some embodiments, the data set stores the pre-stored face image of at least one user having reserved refueling of a vehicle or having been recorded and allowed to refuel a vehicle; and the vehicle control unit 63 is configured to control opening of a fuel filler of the vehicle.

In some embodiments, the data set stores the pre-stored face image of at least one user having reserved charging of a vehicle or having been recorded and allowed to charge a vehicle; and the vehicle control unit 63 is configured to perform control to allow a charging device to connect to a battery of the vehicle.

In one or more optional embodiments, the vehicle control unit 63 is further configured to control the vehicle to issue prompt information for indicating that the user is allowed to use the vehicle.

In one or more optional embodiments, the user image acquisition unit 61 is configured to collect a face image of the user by means of a photographing component provided on the vehicle.

In one or more optional embodiments, the vehicle-mounted intelligent system further includes: a first data download unit, configured to send, when the vehicle is in a communication connection state with a cloud server, a data set download request to the cloud server; and receive and store the data set sent by the cloud server.

In one or more optional embodiments, the vehicle-mounted intelligent system may further include:

an information storage unit, configured to acquire, if the feature matching result indicates that the feature matching is successful, identity information of the user according to the pre-stored face image of which the feature matching is successful; and send the face image and the identity information to the cloud server.

In one or more optional embodiments, the vehicle-mounted intelligent system may further include: a living body detection unit, configured to acquire a living body detection result of the face image; and the vehicle control unit 63 is configured to control, according to the feature matching result and the living body detection result, actions of the vehicle to allow the user to use the vehicle.

In one or more optional embodiments, the vehicle-mounted intelligent system further includes:

a second data download unit, configured to send, when the vehicle is in a communication connection state with a mobile device, a data set download request to the mobile device; and receive and store the data set sent by the mobile device.

According to one or more embodiments of the present disclosure, the data set is acquired from the cloud server and sent to the vehicle by the mobile device upon reception of the data set download request.

In one or more optional embodiments, the vehicle control unit 63 is further configured to control, if the feature matching result indicates that the feature matching is unsuccessful, actions of the vehicle to refuse the user to use the vehicle.

According to one or more embodiments of the present disclosure, the vehicle-mounted intelligent system further includes:

a reservation unit, configured to issue prompt reservation information; receive a reservation request of the user according to the prompt reservation information, the reservation request of the user including a reserved face image of the user; and establish a data set according to the reserved face image.

In one or more optional embodiments, the vehicle-mounted intelligent system further includes:

a state detection unit, configured to perform user state detection based on the face image; and an output unit, configured to output a forewarning prompt for an abnormal state according to the result of the user state detection.

In some of the embodiments, the result of the user state detection may be output.

In some other embodiments, when the user is a driver, intelligent driving control can be performed on the vehicle according to the result of the user state detection.

In still some other embodiments, when the user is a driver, the result of the user state detection may be output, and at the same time, intelligent driving control may be performed on the vehicle according to the result of the user state detection.

According to one or more embodiments of the present disclosure, the user state detection includes any one or more of: user fatigue state detection, user distraction state detection, and user's predetermined distraction action detection.

According to one or more embodiments of the present disclosure, the state detection unit is configured, when performing user fatigue state detection based on the face image, to:

detect at least part of a face region of the face image to obtain state information of the at least part of the face region, the state information of the at least part of the face region including any one or more of: eye open/closed state information and mouth open/closed state information;

acquire a parameter value of an index for representing a user fatigue state according to the state information of the at least part of the face region within a period of time; and determine the result of the user fatigue state detection according to the parameter value of the index for representing the user fatigue state.

According to one or more embodiments of the present disclosure, the index for representing the user fatigue state includes any one or more of: an eye closure degree and a yawning degree.

According to one or more embodiments of the present disclosure, the parameter value of the eye closure degree includes any one or more of: the number of eye closures, eye closure frequency, eye closure duration, eye closure amplitude, the number of eye semi-closures, and eye semi-closure frequency; and/or, the parameter value of the yawning degree includes any one or more of: a yawning state, the number of yawns, yawn duration, and yawning frequency.

According to one or more embodiments of the present disclosure, the state detection unit is configured, when performing user distraction state detection based on the face image, to:

perform face orientation and/or gaze direction detection on the face image to obtain face orientation information and/or gaze direction information;

determine a parameter value of an index for representing a user distraction state according to the face orientation information and/or the gaze direction information within a period of time, the index for representing the user distraction state including any one or more of: a face orientation deviation degree and a gaze deviation degree; and determine the result of the user distraction state detection according to the parameter value of the index for representing the user distraction state.

According to one or more embodiments of the present disclosure, the parameter value of the face orientation deviation degree includes any one or more of: the number of head turns, the head turn duration, and the head turn frequency; and/or, the parameter value of the gaze deviation degree includes any one or more of: a gaze direction deviation angle, gaze direction deviation duration, and gaze direction deviation frequency.

According to one or more embodiments of the present disclosure, the state detection unit is configured, when performing face orientation and/or gaze direction detection on the face image, to:

detect face key points of the face image; and perform face orientation and/or gaze direction detection according to the face key points.

According to one or more embodiments of the present disclosure, the state detection unit is configured, when performing face orientation detection according to the face key points to obtain the face orientation information, to:

obtain feature information of head pose according to the face key points; and determine the face orientation information according to the feature information of the head pose.

According to one or more embodiments of the present disclosure, the predetermined distraction action includes any one or more of: a smoking action, a drinking action, an eating action, a calling action, and an entertainment action.

According to one or more embodiments of the present disclosure, the state detection unit is configured, when performing user's predetermined distraction action detection based on the face image, to:

perform target object detection corresponding to a predetermined distraction action on the face image to obtain a detection frame for a target object; and determine whether the predetermined distraction action occurs according to the detection frame for the target object.

According to one or more embodiments of the present disclosure, the state detection unit is further configured to:

if the predetermined distraction action occurs, acquire a parameter value of an index for representing the user distraction degree according to a determination result indicating whether the predetermined distraction action occurs within a period of time; and determine the result of the user's predetermined distraction action detection according to the parameter value of the index for representing the user distraction degree.

According to one or more embodiments of the present disclosure, the parameter value of the index for representing the user distraction degree includes any one or more of: the number of occurrences of the predetermined distraction action, duration of the predetermined distraction action, and frequency of the predetermined distraction action.

According to one or more embodiments of the present disclosure, the vehicle-mounted intelligent system further includes:

a prompt unit, configured to prompt, if the result of the user's predetermined distraction action detection is that a predetermined distraction action is detected, the detected predetermined distraction action.

In one or more optional embodiments, the vehicle-mounted intelligent system further includes:

a control unit, configured to execute a control operation corresponding to the result of the user state detection.

According to one or more embodiments of the present disclosure, the control unit is configured to:

if the determined result of the user state detection satisfies a predetermined prompt/warning condition, output prompt/warning information corresponding to the predetermined prompt/warning condition; and/or if the determined result of the user state detection satisfies a predetermined information sending condition, send predetermined information to a preset contact or establish a communication connection with the preset contact; and/or if the determined result of the user state detection satisfies a predetermined driving mode switching condition, switch the driving mode to an automatic driving mode.

In one or more optional embodiments, the vehicle-mounted intelligent system further includes:

a result sending unit, configured to send at least part of the result of the user state detection to the cloud server.

According to one or more embodiments of the present disclosure, the at least part of the result includes: abnormal vehicle use state information determined according to the user state detection.

According to one or more embodiments of the present disclosure, the vehicle-mounted intelligent system further includes:

an image storage unit, configured to store face images corresponding to the abnormal vehicle use state information; and/or send the face images corresponding to the abnormal vehicle use state information to the cloud server.

For the working process and the setting mode of any embodiment of the vehicle-mounted intelligent system provided by the embodiments of the disclosure, reference may be made to the specific descriptions of the corresponding method embodiment of the disclosure, and details are not described herein again due to space limitation.

Figure 7:
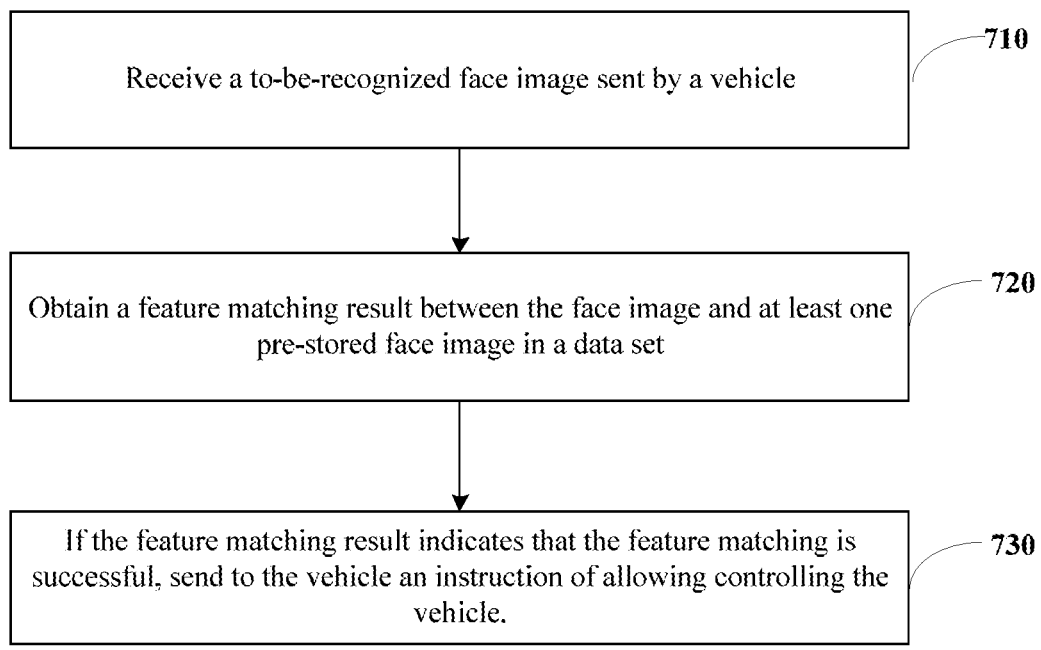
FIG. 7 illustrates a flowchart of a vehicle control method according to some other embodiments of the disclosure.

FIG. 7 is a flowchart of a vehicle control method according to some embodiments of the disclosure. As shown in FIG. 7, the execution subject of the vehicle control method of this embodiment may be a cloud server, for example, the execution subject may be an electronic device or other devices having similar functions. The method of this embodiment includes:

710: Receive a to-be-recognized face image sent by a vehicle.

According to one or more embodiments of the present disclosure, the to-be-recognized face image is collected by the vehicle, and the process of obtaining the to-be-recognized face image may include: face detection, face quality screening, and living body recognition. These processes can ensure that the obtained to-be-recognized face image is a face image of better quality of a real person inside or outside the vehicle, thereby ensuring the effect of the subsequent feature matching.

In an optional example, the operation 710 may be executed by a processor by invoking a corresponding instruction stored in a memory, or may be executed by an image receiving unit 81 run by the processor.

720: Obtain a feature matching result of the to-be-recognized face image and at least one pre-stored face image in a data set.

According to one or more embodiments of the present disclosure, the data set stores the pre-stored face image of at least one pre-recorded user allowed to use the vehicle. According to one or more embodiments of the present disclosure, the cloud server may directly obtain the feature matching result between the face image and the at least one pre-stored face image in the data set from the vehicle, and at this time, the process of feature matching is implemented on the vehicle.

In an optional example, the operation 720 may be executed by a processor by invoking a corresponding instruction stored in a memory, or may be executed by a matching result obtaining unit 82 run by the processor.

730: If the feature matching result indicates that the feature matching is successful, send to the vehicle an instruction indicating allowing controlling the vehicle, if the feature matching result indicates that the feature matching is unsuccessful, send to the vehicle an instruction indicating refusing controlling the vehicle.

In an optional example, the operation 730 may be executed by a processor by invoking a corresponding instruction stored in a memory, or may be executed by an instruction sending unit 83 run by the processor.

Based on the vehicle control method provided by the foregoing embodiment of the disclosure, by implementing face feature matching on the vehicle, the dependence of the user recognition on a network is reduced, feature matching can be implemented without a network, and thus, the safety guarantee of the vehicle is further improved.

According to one or more embodiments of the present disclosure, the vehicle control method further includes:

receiving a data set download request sent by the vehicle, the data set storing pre-stored face images of at least one pre-recorded user allowed to use the vehicle; and sending the data set to the vehicle.

According to one or more embodiments of the present disclosure, the data set is generally stored in the cloud server. In this embodiment, it is necessary to implement face matching on the vehicle. In order to perform face matching without a network, the data set can be downloaded from the cloud server through the network, and the data set is stored on the vehicle. At this time, even if the network is unavailable and it is impossible to communicate with the cloud server, face matching may also be implemented on the vehicle, and the management of the data set by the vehicle is facilitated.

According to one or more embodiments of the present disclosure, the vehicle control method further includes:

acquiring a data set download request sent by a mobile device, the data set storing pre-stored face images of at least one pre-recorded user allowed to use the vehicle; and sending the data set to the mobile device.

According to one or more embodiments of the present disclosure, the mobile device may be a mobile phone, a PAD, or other terminal devices on the vehicle. Upon reception of the data set download request, the mobile device sends the data set download request to the cloud server, and then obtains the data set to be sent to the vehicle. When the mobile device downloads the data set, the built-in network of the mobile device (e.g., 2G network, 3G network, 4G network, and the like) may be applied, thereby avoiding the problem that the vehicle cannot download the data set from the cloud server without a network and thus cannot perform face matching.

In one or more optional embodiments, the vehicle control method further includes:

receiving a reservation request sent by the vehicle or a mobile terminal device, the reservation request including a reserved face image of the user; and establishing a data set according to the reserved face image.

In order to recognize whether the user has reserved, the reserved face images corresponding to the reserved users are first stored. In this embodiment, a data set is established for the reserved face images at the cloud server, and the reserved face images of multiple reserved users are saved in the data set by means of the cloud server, thereby ensuring the data security.

In one or more optional embodiments, the vehicle control method further includes:

receiving at least part of the result of the user state detection sent by the vehicle, and outputting a forewarning prompt for an abnormal vehicle use state.

According to one or more embodiments of the present disclosure, the at least part of the result includes: abnormal vehicle use state information determined according to the user state detection.

Sending some or all results obtained by the user state detection to the cloud server may realize backup of the abnormal vehicle use state information. Since there is no need to record the normal driving state, only the abnormal vehicle use state information is sent to the cloud server in this embodiment. When the obtained result of the user state detection includes normal vehicle use state information and abnormal vehicle use state information, some results are transmitted, i.e., only the abnormal vehicle use state information is sent to the cloud server. Moreover, when all results of the user state detection are abnormal vehicle use state information, all abnormal vehicle use state information is sent to the cloud server.

In one or more optional embodiments, the vehicle control method further includes: executing a control operation corresponding to the result of the user state detection.

According to one or more embodiments of the present disclosure, when the user is a driver, if the determined result of the user state detection satisfies a predetermined prompt/warning condition, e.g., satisfying a preset condition corresponding to the prompt state (e.g., the driving state is poor) or the state level is the driving prompt state (e.g., the driving state is poor), outputting prompt/warning information corresponding to the predetermined prompt/warning condition, e.g., prompting the user with sound (e.g., voice or ringing, and the like)/light (e.g., light up or light flickering, and the like)/vibration and the like to call for attention of the user so that the user returns the distracted attention to driving or takes a rest, thereby realizing safe driving and avoiding road traffic accidents; and/or when the user is a driver, if the determined result of the user state detection satisfies a predetermined driving mode switching condition, e.g., satisfying a preset condition corresponding to the driving warning state (e.g., the driving state is very poor), or the driving state level is the distraction driving warning level (also called the severe distraction driving level), switching the driving mode to an automatic driving mode to implement safe driving and avoid road traffic accidents; moreover, prompting the user with sound (e.g., voice or ringing and the like)/light (light up or light flickering and the like)/vibration and the like to call for attention of the user so that the user returns the distracted attention to driving or takes a rest.

if the determined result of the user state detection satisfies a predetermined information sending condition, sending predetermined information to a predetermined contact or establishing a communication connection with the predetermined contact, for example, it is agreed that when the user makes certain or some actions, it is indicated that the user is in a dangerous state or needs help; when these actions are detected, sending the predetermined information (such as, alarm information, prompt information or dial-up call) to the predetermined contact (for example, alarm call, recent contact person's number or the set emergency contact person's number), and establishing a communication connection (e.g., video call, voice call or calling) with the predetermined contact directly by means of a vehicle-mounted device to guarantee the user's personal and/or property safety.

According to one or more embodiments of the present disclosure, the vehicle control method further includes: receiving face images corresponding to the abnormal vehicle use state information and sent by the vehicle.

In this embodiment, in order to prevent data on the vehicle from being accidentally deleted or deliberately deleted, the face images corresponding to the abnormal vehicle use state information may be uploaded to the cloud server for backup. When the information is needed, the face images may be downloaded from the cloud server to the vehicle for viewing, or be downloaded from the cloud server to other clients for viewing.

According to one or more embodiments of the present disclosure, the vehicle control method further includes: performing at least one of the following operations based on the abnormal vehicle use state information:

data statistics, vehicle management, and user management.

The cloud server may receive the abnormal vehicle use state information of multiple vehicles and may implement big data-based data statistics, management of the vehicles and users, so as to provide better service for the vehicles and users.

According to one or more embodiments of the present disclosure, the performing data statistics based on the abnormal vehicle use state information includes:

collecting, based on the abnormal vehicle use state information, statistics on the received face images corresponding to the abnormal vehicle use state information to classify the face images according to different abnormal vehicle use states, so as to determine statistics of each of the abnormal vehicle use states.

By collecting classified statistics about each different abnormal vehicle use state, the abnormal vehicle use state that often occurs to the user and is based on big data can be obtained, and more reference data can be provided for the vehicle developer so as to provide settings or apparatuses more suitable for the abnormal vehicle use state in the vehicle to provide a more comfortable driving environment for the user.

According to one or more embodiments of the present disclosure, the performing vehicle management based on the abnormal vehicle use state information includes:

collecting, based on the abnormal vehicle use state information, statistics on the received face images corresponding to the abnormal vehicle use state information to classify the face images according to different vehicles, so as to determine abnormal vehicle use statistics of each of the vehicles.

By collecting statistics about the abnormal vehicle use state information based on the vehicle, the abnormal vehicle use state information of all users corresponding to the vehicle may be processed, for example, when a problem occurs to a certain vehicle, the responsibility determination may be implemented by checking all pieces of abnormal vehicle use state information corresponding to the vehicle.

According to one or more embodiments of the present disclosure, the performing user management based on the abnormal vehicle use state information includes:

processing, based on the abnormal vehicle use state information, the received face images corresponding to the abnormal vehicle use state information to classify the face images according to different users, so as to determine abnormal vehicle use statistics of each of the users.

By collecting statistics about the abnormal driving state information based on the user, the driving habits of each user and frequently occurring problems can be obtained, and each user can be provided with a personalized service, so that no interference is caused to users having good vehicle use habits while achieving the purpose of safe driving. For example, after collecting statistics about the abnormal driving state information, it is determined that a certain user often yawns while driving, and prompt information of higher volume can be provided for the user.

A person of ordinary skill in the art may understand that all or some steps of implementing the forgoing embodiments of the method may be achieved by a program by instructing related hardware; the program can be stored in a computer readable storage medium; when the program is executed, steps including the foregoing embodiments of the method are executed. Moreover, the storage medium includes various media capable of storing program code, such as ROM, RAM, a magnetic disk, or an optical disk.

Figure 8:
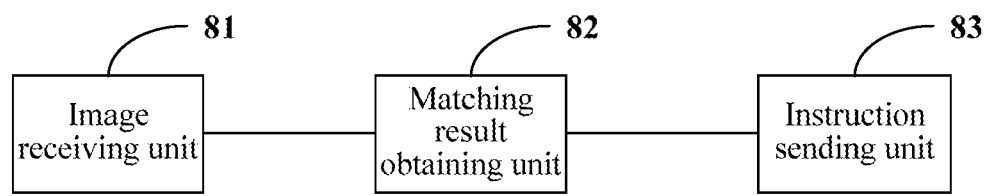
FIG. 8 illustrates a schematic structural diagram of an electronic device according to some embodiments of the disclosure.

FIG. 8 is a schematic structural diagram of an electronic device according to some embodiments of the disclosure. The electronic device of this embodiment can be configured to implement the foregoing embodiments of the vehicle control methods of the disclosure. As shown in FIG. 8, the electronic device of this embodiment includes:

an image receiving unit 81, configured to receive a to-be-identified face image sent by a vehicle.

A matching result obtaining unit 82, configured to obtain a feature matching result of the face image and at least one pre-stored face image in a data set.

According to one or more embodiments of the present disclosure, the data set stores the pre-stored face image of at least one user having been recorded and allowed to use the vehicle. According to one or more embodiments of the present disclosure, the cloud server may directly obtain the feature matching result between the face image and the at least one pre-stored face image in the data set from the vehicle, and at this time, the process of feature matching is implemented on the vehicle.

An instruction sending unit 83, configured to send, if the feature matching result indicates that the feature matching is successful, to the vehicle an instruction indicating allowing controlling the vehicle. The instruction sending unit 83 is further configured to send, if the feature matching result indicates that the feature matching is unsuccessful, to the vehicle an instruction indicating refusing controlling the vehicle.

Based on the vehicle control method provided by the foregoing embodiment of the disclosure, by implementing face feature matching on the vehicle, the dependence of the user recognition on a network is reduced, feature matching can be implemented without a network, and thus, the safety guarantee of the vehicle is further improved.

According to one or more embodiments of the present disclosure, the electronic device further includes:

a data sending unit, configured to receive a data set download request sent by the vehicle, the data set storing pre-stored face images of at least one pre-recorded user allowed to use the vehicle; and send the data set to the vehicle.

According to one or more embodiments of the present disclosure, the data sending unit is further configured to receive a data set download request sent by a mobile device, the data set storing pre-stored face images of at least one pre-recorded user allowed to use the vehicle; and send the data set to the mobile device.

In one or more optional embodiments, the electronic device further includes:

a reservation request receiving unit, configured to receive a reservation request sent by the vehicle or a mobile terminal device, the reservation request including a reserved face image of the user; and establish a data set according to the reserved face image.

In one or more optional embodiments, the electronic device further includes:

a detection result receiving unit, configured to receive at least part of the result of the user state detection sent by the vehicle, and output a forewarning prompt for an abnormal vehicle use state.

According to one or more embodiments of the present disclosure, the at least part of the result includes: abnormal vehicle use state information determined according to the user state detection.

In one or more optional embodiments, the electronic device further includes: a control execution unit, configured to execute a control operation corresponding to the result of the user state detection.

According to one or more embodiments of the present disclosure, the control execution unit is configured to:

if the determined result of the user state detection satisfies a predetermined prompt/warning condition, output prompt/warning information corresponding to the predetermined prompt/warning condition; and/or if the determined result of the user state detection satisfies a predetermined information sending condition, send predetermined information to a predetermined contact or establish a communication connection with the predetermined contact; and/or if the determined result of the user state detection satisfies a predetermined driving mode switching condition, switch the driving mode to an automatic driving mode.

According to one or more embodiments of the present disclosure, the electronic device further includes:

a state image receiving unit, configured to receive face images corresponding to the abnormal vehicle use state information and sent by the vehicle.

According to one or more embodiments of the present disclosure, the electronic device further includes:

an abnormality processing unit, configured to perform at least one of the following operations based on the abnormal vehicle use state information: data statistics, vehicle management, and user management.

According to one or more embodiments of the present disclosure, the abnormality processing unit is configured, when performing data statistics based on the abnormal vehicle use state information, to collect, based on the abnormal vehicle use state information, statistics on the received face images corresponding to the abnormal vehicle use state information to classify the face images according to different abnormal vehicle use states, so as to determine statistics of each of the abnormal vehicle use states.

According to one or more embodiments of the present disclosure, the abnormality processing unit is configured, when performing vehicle management based on the abnormal vehicle use state information, to collect, based on the abnormal vehicle use state information, statistics on the received face images corresponding to the abnormal vehicle use state information to classify the face images according to different vehicles, so as to determine abnormal vehicle use statistics of each of the vehicles.

According to one or more embodiments of the present disclosure, the abnormality processing unit is configured, when performing user management based on the abnormal vehicle use state information, to process, based on the abnormal vehicle use state information, the received face images corresponding to the abnormal vehicle use state information to classify the face images according to different users, so as to determine abnormal vehicle use statistics of each of the users.

For the working process and the setting mode of any embodiment of the electronic device provided by the embodiments of the disclosure, reference may be made to the specific descriptions of the corresponding method embodiment of the disclosure, and details are not described herein again due to space limitation.

A vehicle management system provided according to another aspect of the embodiments of the disclosure includes: a vehicle and/or a cloud server;

the vehicle is configured to execute any of the vehicle control methods in the embodiments shown in FIGS. 1-5; and the cloud server is configured to execute any of the vehicle control methods in the embodiment shown in FIG. 7.

According to one or more embodiments of the present disclosure, the vehicle management system further includes: a mobile device, configured to:

receive a user registration request including a registered face image of a user; and send the user registration request to the cloud server.

The vehicle management system of this embodiment implements face matching on a vehicle client without depending on the cloud, and thus reduces the traffic cost for real-time data transmission, and has high flexibility and low dependence on a network. The data set of the vehicle may be downloaded when the network is available, and feature extraction may be performed when the vehicle is idle, so that the dependence on the network is reduced. The user may not depend on the network when requesting to use a vehicle, and upload the comparison result when the network is available after the authentication is successful.

Figure 9:
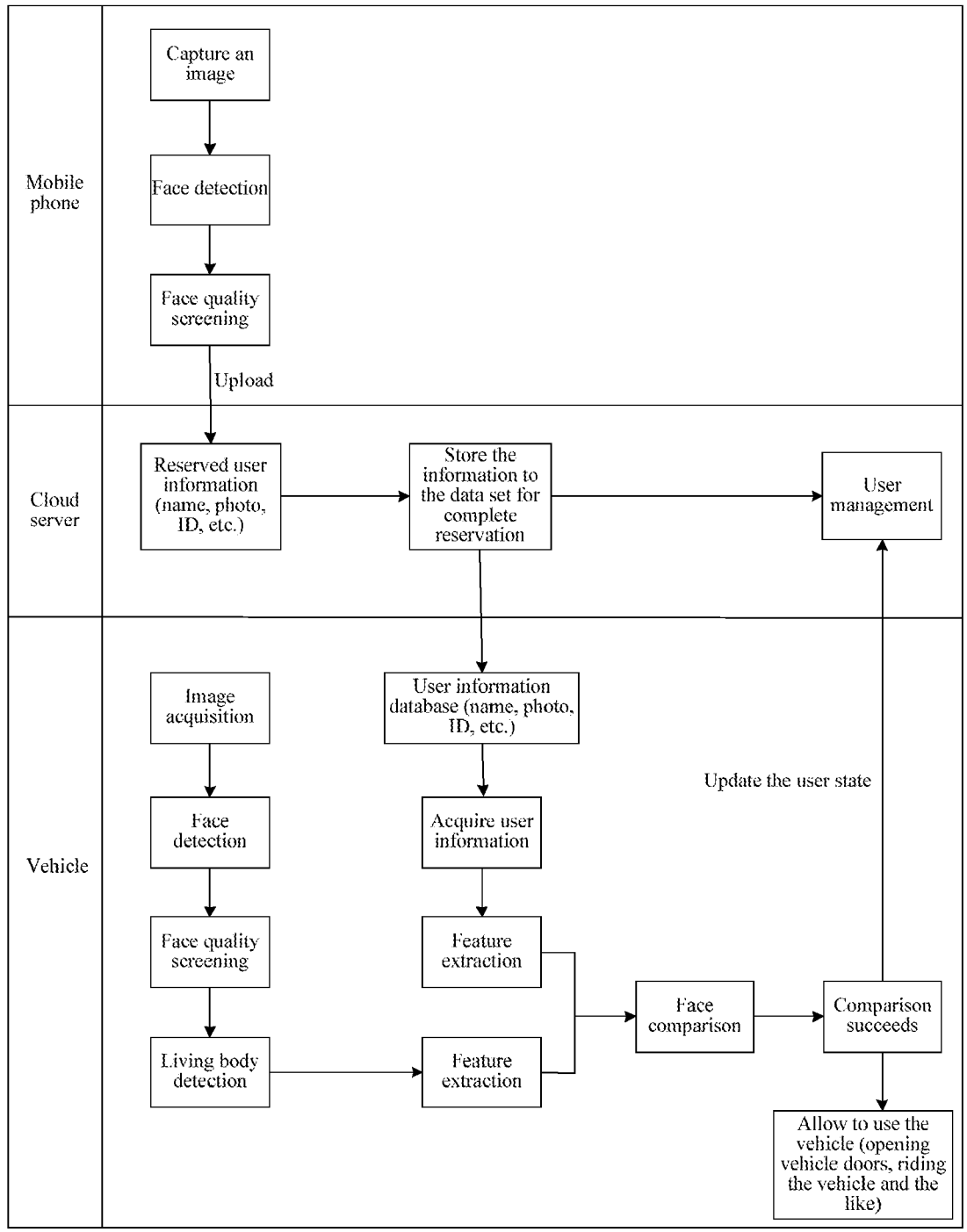
FIG. 9 illustrates a flowchart of use of a vehicle management system according to some embodiments of the disclosure.

FIG. 9 is a flowchart of use of a vehicle management system according to some embodiments of the disclosure. As shown in FIG. 9, the reservation process implemented by the foregoing embodiments is implement on a mobile phone (a mobile device), the selected face images and user ID information are uploaded to the cloud server; the cloud server stores the face images and the user ID information in a reserved data set; after images of a requesting person are collected, the reserved data set is downloaded by means of the vehicle to the vehicle client for matching. The vehicle acquires the images of the requesting person, and performs face detection, quality screening, and living body recognition on the images of the requesting person in sequence, so as to match the selected face image of the requesting person with all face images in the reserved data set. The matching is implemented based on face features, and the face features can be obtained by extraction via a neural network. Whether the face image of the requesting person is the reserved person is determined based on the comparison result, and the reserved person is allowed to use the vehicle.

During specific applications, the disclosure may include three parts: a mobile device (such as a mobile phone), a cloud server, and a vehicle (such as a vehicle terminal). Specifically, the mobile phone takes photos, performs quality screening, and then uploads photos and personal information to the cloud for storage, thereby implementing the reservation process. The cloud synchronizes the personal information to the vehicle terminal. The vehicle terminal performs face recognition comparison according to the personal information, and then instructs the cloud to update the user state while making intelligent judgments. The specific advantages include: the real-time performance is good, the response speed is fast, and a deep learning technology and an embedded chip optimization technology are combined; the vehicle terminal supports ARM, X86 mainstream platforms (supporting vehicle-mounted chips IMX6, Cotex-A9 800 MHz with lower price); and the flexibility is high, the dependence on network is low, and the synchronization of the vehicle terminal information can be completed when the network is available. The user does not depend on the network when logging in to use the vehicle, and can upload the state information when the network is available after the authentication is successful. The process is clear and simple, the size of pictures transmitted through the network can be clipped according to the face location, and network overhead is reduced. The size of the picture is dozens of K after JPEG compression. By storing and managing data by means of the cloud, the data is not easy to lose and has good expansibility. The joint optimization of the whole process of face recognition ensures the final recognition accuracy.

An electronic device provided according to another aspect of the embodiments of the disclosure includes: a memory, configured to store executable instructions; and a processor, configured to communicate with the memory to execute the executable instructions so as to complete the vehicle control method according to any one of the foregoing embodiments.

Figure 10:
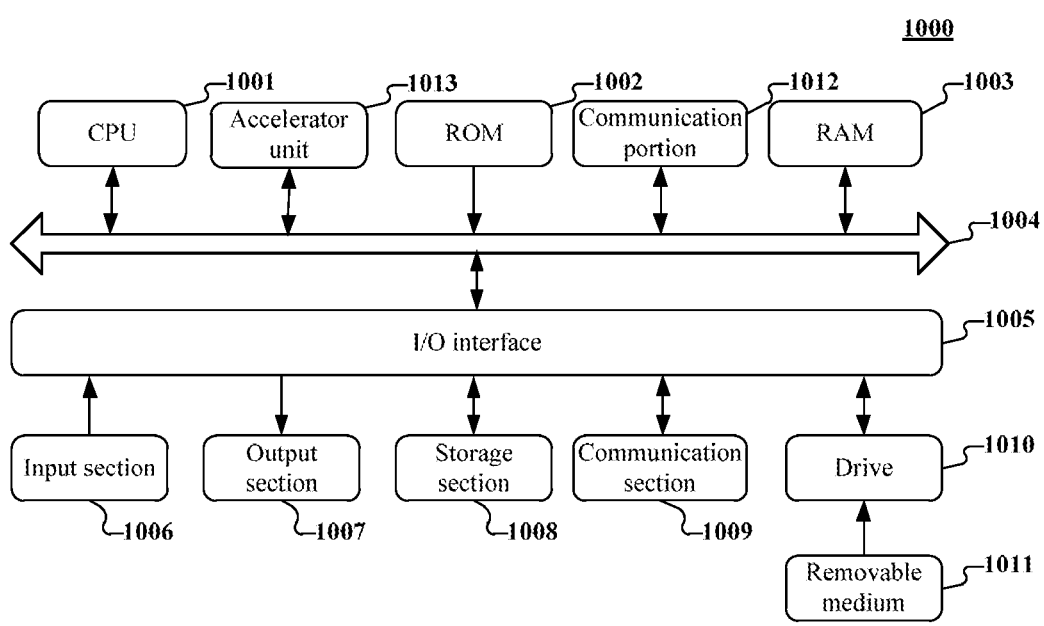
FIG. 10 illustrates a schematic structural diagram of an application example of an electronic device according to some embodiments of the disclosure.

FIG. 10 is a schematic structural diagram of an application example of an electronic device according to some embodiments of the disclosure. Referring to FIG. 10 below, FIG. 10 is a schematic structural diagram of an electronic device suitable for implementing a terminal device or a server according to an embodiment of the disclosure. As shown in FIG. 10, the electronic device includes one or more processors, a communication portion and the like; the one or more processors are, for example, one or more central processing units (CPUs) 1001, and/or one or more accelerator units 1013 or the like; the accelerator units may include, but are not limited to, GPU, FPGA, and other types of dedicated processors or the like; the processor may execute various appropriate actions and processing according to executable instructions stored in a read-only memory (ROM) 1002 or executable instructions loaded from a memory portion 1008 into a random access memory (RAM) 1003. The communication portion 1012 may include, but is not limited to, a network card, which may include, but is not limited to, an IB (Infiniband) network card, and the processor may communicate with the ROM 1002 and/or the RAM 1003 to execute executable instructions, is connected to the communication portion 1012 through the bus 1004, and communicates with other target devices via the communication portion 1012, thereby completing operations corresponding to any method provided by the embodiments of the disclosure, for example, acquiring a face image of a user currently requesting to use a vehicle; acquiring a feature matching result between the face image and at least one pre-stored face image in a data set of the vehicle; and if the feature matching result indicates that the feature matching is successful, controlling actions of the vehicle to allow the user to use the vehicle.

In addition, the RAM 1003 may further store various programs and data required during an operation of the apparatus. The CPU 1001, the ROM 1002, and the RAM 1003 are connected to each other via the bus 1004. In the presence of the RAM 1003, the ROM 1002 is an optional module. The RAM 1003 stores executable instructions, or writes executable instructions to the ROM 1002 during running. The executable instructions cause the CPU 1001 to perform the operations corresponding to any one of the foregoing methods of the disclosure. An input/output (I/O) interface 1005 is also connected to the bus 1004. The communication portion 1012 may be integrated, or may be configured to have multiple sub-modules (such as, multiple IB network cards) separately connected to the bus.

The following components are connected to the I/O interface 1005: an input section 1006 including a keyboard, a mouse and the like; an output section 1007 including a cathode-ray tube (CRT), a liquid crystal display (LCD), a speaker and the like; a storage section 1008 including a hard disk and the like; and a communication section 1009 of a network interface card including an LAN card, a modem and the like. The communication section 1009 executes communication processing through a network such as the Internet. A drive 1011 is also connected to the I/O interface 1005 according to requirements. A removable medium 1011 such as a magnetic disk, an optical disk, a magneto-optical disk, a semiconductor memory or the like is mounted on the drive 1010 according to requirements, so that a computer program read from the removable medium may be installed on the storage section 1008 according to requirements.

It should be noted that, the architecture shown in FIG. 10 is merely an optional implementation. During specific practice, a number and types of the components in FIG. 10 may be selected, decreased, increased, or replaced according to actual requirements. Different functional components may be separated or integrated or the like. For example, the accelerator unit 1013 and the CPU 1001 may be separated, or the accelerator unit 1013 may be integrated on the CPU 1001, and the communication portion may be separated from or integrated on the CPU 1001 or the accelerator unit 1013 or the like. These alternative implementations all fall within the protection scope of the disclosure.

Particularly, a process described above with reference to a flowchart according to an embodiment of the disclosure may be implemented as a computer software program. For example, an embodiment of the disclosure includes a computer program product. The computer program product includes a computer program tangibly included in a machine-readable medium. The computer program includes a program code for executing a method shown in the flowchart. The program code may include instructions for executing the steps of the vehicle control method provided by any one of the embodiments of the disclosure correspondingly. In such embodiment, the computer program may be downloaded and installed from the network through the communication section 1009, and/or is installed from the removable medium 1011. The computer program is executed by the processor to execute corresponding operations in any method of the disclosure.

A non-transitory computer storage medium provided according to another aspect of the embodiments of the disclosure is configured to store computer readable instructions. When the instructions are executed, the operations of the vehicle control method according to any one of the foregoing embodiments are executed.

The embodiments of the present description are all described in a progressive manner, and each embodiment focuses on illustrating differences from one another. Mutual references may be made to the same or similar portions among these embodiments. The system disclosed in the embodiments corresponds to the method disclosed in the embodiments, and therefore is described relatively simply. For related parts, reference may be made to related descriptions of the method embodiments.

The methods, the apparatuses, the systems and the devices of the disclosure may be implemented in many manners. For example, the methods, apparatuses, systems and devices of the disclosure may be implemented by using software, hardware, firmware, or any combination of software, hardware, and firmware. Unless otherwise specially stated, the foregoing sequences of steps of the methods are merely for description, and are not intended to limit the steps of the methods of the disclosure. In addition, in some embodiments, the disclosure may be implemented as programs recorded in a recording medium. The programs include machine-readable instructions for implementing the methods according to the disclosure. Therefore, the disclosure further covers the recording medium storing the programs for performing the methods according to the disclosure.

The descriptions of the disclosure are provided for the purpose of examples and description, and are not intended to be exhaustive or limit the disclosure to the disclosed form. Many modifications and changes are obvious to a person of ordinary skill in the art. The embodiments are selected and described to better describe a principle and an actual application of the disclosure, and to make a person of ordinary skill in the art understand the disclosure, so as to design various embodiments with various modifications applicable to particular use.

The invention claimed is:

1. A vehicle control method, performed by a vehicle device, comprising:

acquiring, by a photographing component provided on a vehicle, a face image of a user currently requesting to use the vehicle, wherein the operation of using the vehicle comprises at least one of reserving use of a vehicle, driving a vehicle, riding a vehicle, cleaning a vehicle, maintaining a vehicle, repairing a vehicle, refueling a vehicle, or charging a vehicle;

acquiring a result of a feature matching between the face image and at least one pre-stored face image in a data set of the vehicle, wherein the data set stores one or more pre-stored face images of at least one pre-recorded user allowed to use the vehicle, and the data set stores the pre-stored face image of at least one user having reserved a ride; and in response to that the result of the feature matching indicates that the feature matching is successful, controlling actions of the vehicle to allow the user to use the vehicle, otherwise, controlling the actions of the vehicle to refuse the user to use the vehicle, wherein the operation of controlling actions of the vehicle to allow the user to use the vehicle comprises at least one of: controlling opening of vehicle doors, release of driving control rights of the vehicle, controlling opening of a vehicle lock, controlling opening of a fuel filler of the vehicle or performing control to allow a charging device to connect to a battery of the vehicle.

2. The method according to claim 1, further comprising: controlling the vehicle to issue prompt information for indicating that the user is allowed to use the vehicle.

3. The method according to claim 1, wherein the operation of acquiring a face image of a user currently requesting to use a vehicle comprises:
collecting a face image of the user by means of a photographing component provided on the vehicle.

4. The method according to claim 1, further comprising:
when the vehicle is in a communication connection state with a cloud server, sending a data set download request to the cloud server; and
receiving and storing the data set sent by the cloud server; or when the vehicle is in a communication connection state with a mobile device, sending the data set download request to the mobile device; and
receiving and storing the data set sent by the mobile device, wherein the data set is acquired from the cloud server and sent to the vehicle by the mobile device upon reception of the data set download request.

5. The method according to claim 1, further comprising:
in response to that the result of the feature matching indicates that the feature matching is successful, acquiring identity information of the user according to a pre-stored face image of which the feature matching is successful; and
sending the face image and the identity information to a cloud server.

6. The method according to claim 1, further comprising: acquiring a living body detection result of the face image;
the operation of controlling, according to the result of the feature matching, actions of the vehicle to allow the user to use the vehicle comprises:
controlling, according to the result of the feature matching and the living body detection result, the actions of the vehicle to allow the user to use the vehicle.

7. The method according to claim 6, further comprising:
issuing prompt reservation information;
receiving a reservation request of the user according to the prompt reservation information, the reservation request of the user comprising a reserved face image of the user; and
establishing a data set according to the reserved face image.

8. The method according to claim 1, further comprising:
performing user state detection based on the face image;
outputting a forewarning prompt for an abnormal state according to a result of the user state detection, wherein the user state detection comprises at least one of: user fatigue state detection, user distraction state detection, or user's predetermined distraction action detection;
wherein the operation of performing user fatigue state detection based on the face image comprises:
detecting at least part of a face region of the face image to obtain state information of the at least part of the face region, the state information of the at least part of the face region comprising at least one of: eye open/closed state information or mouth open/closed state information;
acquiring a parameter value of an index for representing a user fatigue state according to the state information of the at least part of the face region within a period of time;
determining a result of the user fatigue state detection according to the parameter value of the index for representing the user fatigue state, wherein the index for representing the user fatigue state comprises at least one of an eye closure degree or a yawning degree;
wherein the parameter value of the eye closure degree comprises at least one of the number of eye closures, eye closure frequency, eye closure duration, eye closure amplitude, the number of eye semi-closures, or eye semi-closure frequency; and
the parameter value of the yawning degree comprises at least one of a yawning state, the number of yawns, yawning duration, or yawning frequency.

9. The method according to claim 8, wherein the operation of performing user distraction state detection based on the face image comprises:
performing at least one of the following operations:
performing face orientation detection on the face image to obtain face orientation information; or
performing gaze direction detection on the face image to obtain gaze direction information;
determining a parameter value of an index for representing a user distraction state according to at least one of the face orientation information or the gaze direction information within a period of time, the index for representing the user distraction state comprising at least one of a face orientation deviation degree or a gaze deviation degree, wherein the parameter value of the face orientation deviation degree comprises at least one of the number of head turns, head turning duration, or head turning frequency; and the parameter value of the gaze deviation degree comprises at least one of a gaze direction deviation angle, gaze direction deviation duration, or gaze direction deviation frequency; and
determining a result of the user distraction state detection according to the parameter value of the index for representing the user distraction state.

10. The method according to claim 9, wherein the operation of performing face orientation on the user in the face image comprises: detecting face key points of the face image; and performing face orientation according to the face key points; and
wherein the operation of performing gaze direction detection on the user in the face image comprises: detecting face key points of the face image; and performing gaze direction detection according to the face key points.

11. The method according to claim 10, wherein the operation of performing face orientation detection according to the face key points to obtain the face orientation information comprises:
acquiring feature information of head pose according to the face key points; and
determining the face orientation information according to the feature information of the head pose.

12. The method according to claim 8, wherein the predetermined distraction action comprises at least one of a smoking action, a drinking action, an eating action, a calling action, or an entertainment action, wherein the operation of performing user's predetermined distraction action detection based on the face image comprises:
performing target object detection corresponding to the predetermined distraction action on the face image to obtain a detection frame for a target object;
determining whether the predetermined distraction action occurs according to the detection frame for the target object.

13. The method according to claim 12, further comprising:
- in response to that the predetermined distraction action occurs, acquiring a parameter value of an index for representing a user distraction degree according to the determination result indicating whether the predetermined distraction action occurs within a period of time, wherein the parameter value of the index for representing the user distraction degree comprises at least one of the number of occurrences of the predetermined distraction action, duration of the predetermined distraction action, or frequency of the predetermined distraction action; and
- determining the result of the user's predetermined distraction action detection according to the parameter value of the index for representing the user distraction degree.

14. The method according to claim 12, further comprising:
- in response to that the result of the user's predetermined distraction action detection is that a predetermined distraction action is detected, prompting the detected predetermined distraction action.

15. The method according to claim 8, further comprising:
executing a control operation corresponding to the result of the user state detection, comprising at least one of:
- in response to that the determined result of the user state detection satisfies a predetermined prompt/warning condition, outputting prompt/warning information corresponding to the predetermined prompt/warning condition;
- in response to that the determined result of the user state detection satisfies a predetermined information sending condition, sending predetermined information to a preset contact or establishing a communication connection with the preset contact; or
- in response to that the determined result of the user state detection satisfies a predetermined driving mode switching condition, switching a driving mode to an automatic driving mode.

16. The method according to claim 8, further comprising:
sending at least part of the result of the user state detection to a cloud server,
wherein the at least part of the result comprises: abnormal vehicle use state information determined according to the user state detection; and the method further comprises at least one of:
- storing face images corresponding to the abnormal vehicle use state information; or
- sending the face image corresponding to the abnormal vehicle use state information to the cloud server.

17. A non-transitory computer storage medium for storing computer readable instructions, applied in a vehicle device, wherein the instructions are executed to implement the vehicle control method according to claim 1.

18. A vehicle-mounted intelligent system, comprising:
a processor; and
memory for storing instructions executable by the processor; when the instructions are executed by the processor, causing the executions of a method comprising:
- acquiring a face image of a user currently requesting to use a vehicle, wherein the operation of using the vehicle comprises at least one of reserving use of a vehicle, driving a vehicle, riding a vehicle, cleaning a vehicle, maintaining a vehicle, repairing a vehicle, refueling a vehicle, or charging a vehicle;
- acquiring a result of a feature matching between the face image and at least one pre-stored face image in a data set of the vehicle, wherein the data set stores one or more pre-stored face images of at least one pre-recorded user allowed to use the vehicle, and the data set stores the pre-stored face image of at least one user having reserved a ride; and
- in response to that the result of the feature matching indicates that the feature matching is successful, controlling actions of the vehicle to allow the user to use the vehicle, otherwise, controlling the actions of the vehicle to refuse the user to use the vehicle, wherein the operation of controlling actions of the vehicle to allow the user to use the vehicle comprises at least one of: controlling opening of vehicle doors, release of driving control rights of the vehicle, controlling opening of a vehicle lock, controlling opening of a fuel filler of the vehicle or performing control to allow a charging device to connect to a battery of the vehicle.

19. A vehicle control method, performed by a cloud server, comprising:
receiving a to-be-recognized face image sent by a vehicle;
acquiring a result of a feature matching between the to-be-recognized face image and at least one pre-stored face image in a data set, wherein the data set stores one or more pre-stored face images of at least one pre-recorded user allowed to use the vehicle, and the data set stores the pre-stored face image of at least one user having reserved a ride, wherein the operation of using the vehicle comprises at least one of reserving use of a vehicle, driving a vehicle, riding a vehicle, cleaning a vehicle, maintaining a vehicle, repairing a vehicle, refueling a vehicle, or charging a vehicle; and
in response to that the result of the feature matching indicates that the feature matching is successful, sending to the vehicle an instruction indicating allowing controlling actions of the vehicle, otherwise, sending to the vehicle an instruction indicating refusing controlling actions of the vehicle, wherein the operation of controlling actions of the vehicle to allow the user to use the vehicle comprises at least one of: controlling opening of vehicle doors, release of driving control rights of the vehicle, controlling opening of a vehicle lock, controlling opening of a fuel filler of the vehicle or performing control to allow a charging device to connect to a battery of the vehicle.

20. The method according to claim 19, further comprising:
receiving a data set download request sent by the vehicle;
sending the data set to the vehicle;
receiving a reservation request sent by the vehicle or a mobile device, the reservation request comprising a reserved face image of the user; and
establishing a data set according to the reserved face image.

21. The method according to claim 19, wherein the operation of acquiring a feature matching result between the face image and at least one pre-stored face image in a data set comprises:
acquiring, from the vehicle, the feature matching result between the face image and the at least one pre-stored face image in the data set.

22. The method according to claim 19, further comprising:
receiving at least part of the result of the user state detection sent by the vehicle, and performing a fore-warning prompt for an abnormal vehicle use state, wherein the at least part of the result comprises: abnormal vehicle use state information determined according to the user state detection;

executing a control operation corresponding to the result of the user state detection, comprising at least one of:

in response to that the determined result of the user state detection satisfies a predetermined prompt/warning condition, outputting prompt/warning information corresponding to the predetermined prompt/warning condition;

in response to that the determined result of the user state detection satisfies a predetermined information sending condition, sending predetermined information to a predetermined contact or establishing a communication connection with the predetermined contact; or in response to that the determined result of the user state detection satisfies a predetermined driving mode switching condition, switching the driving mode to an automatic driving mode.

23. The method according to claim 22, further comprising: receiving face images corresponding to the abnormal vehicle use state information and sent by the vehicle.

24. The method according to claim 23, further comprising:

performing at least one of the following operations based on the abnormal vehicle use state information: data statistics, vehicle management, or user management;

wherein the operation of performing data statistics based on the abnormal vehicle use state information comprises:

collecting, based on the abnormal vehicle use state information, statistics on the received face images corresponding to the abnormal vehicle use state information to classify the face images according to different abnormal vehicle use states, so as to determine statistics of each of the abnormal vehicle use states;

wherein the operation of performing vehicle management based on the abnormal vehicle use state information comprises:

collecting, based on the abnormal vehicle use state information, statistics on the received face images corresponding to the abnormal vehicle use state information to classify the face images according to different vehicles, so as to determine abnormal vehicle use statistics of each of the vehicles;

wherein the operation of performing user management based on the abnormal vehicle use state information comprises:

processing, based on the abnormal vehicle use state information, the receive face images corresponding to the abnormal vehicle use state information to classify the face images according to different users, so as to determine abnormal vehicle use statistics of each of the users.

25. An electronic device, comprising:

a processor; and memory for storing instructions executable by the processor;

when the instructions are executed by the processor, causing the executions of a method according to claim 19.

26. A non-transitory computer storage medium for storing computer readable instructions, applied in a cloud server, wherein the instructions are executed to implement the vehicle control method according to claim 19.

* * * * *